United States Patent
Gibson et al.

(10) Patent No.: US 8,067,328 B2
(45) Date of Patent: Nov. 29, 2011

(54) POLYMERISATION AND OLIGOMERISATION CATALYSTS

(75) Inventors: Vernon Charles Gibson, London (GB); Atanas Kostadinov Tomov, Surrey (GB); Grant Berent Jacobsen, Tervuren (BE)

(73) Assignee: Ineos Europe Limited, Hampshire (GB)

( * ) Notice: Subject to any disclaimer, the term of this patent is extended or adjusted under 35 U.S.C. 154(b) by 724 days.

(21) Appl. No.: 11/660,050

(22) PCT Filed: Jul. 25, 2005

(86) PCT No.: PCT/GB2005/002904
§ 371 (c)(1),
(2), (4) Date: Feb. 12, 2007

(87) PCT Pub. No.: WO2006/016101
PCT Pub. Date: Feb. 16, 2006

(65) Prior Publication Data
US 2007/0207918 A1    Sep. 6, 2007

(30) Foreign Application Priority Data

Aug. 12, 2004 (GB) ................... 0418022.0

(51) Int. Cl.
*C08F 4/602* (2006.01)
*B01J 31/22* (2006.01)
(52) U.S. Cl. ..... 502/167; 502/103; 502/115; 526/124.2; 526/124.9; 526/161
(58) Field of Classification Search ................ 502/103, 502/115, 167; 526/124.2, 124.9, 161
See application file for complete search history.

(56) References Cited

U.S. PATENT DOCUMENTS
7,253,132 B2 *   8/2007   Nakayama et al. ........... 502/115

FOREIGN PATENT DOCUMENTS
WO    WO 2004/037870 A    5/2004

OTHER PUBLICATIONS

Tomov et al., "Bis(benzimidazole)amine vanadium catalyst for olefin polymerization and copolymerization: thermally robust, single-site catalysts activated by sinple alkylaluminium reagents", Chem. Commum., 2004, 1954-1957.*

* cited by examiner

*Primary Examiner* — Caixia Lu
(74) *Attorney, Agent, or Firm* — Nixon & Vanderhye

(57) ABSTRACT

A polymerization catalyst composition comprising (1) a transition metal compound of Formula (A), Z being 5-membered heterocyclic containing at least one carbon, at least one nitrogen and at least one of nitrogen, sulphur and oxygen, the others being nitrogen or carbon; M is a Group 3 to 11 metal or a lanthamide metal; $E^1$ and $E^2$ are divalent groups of aliphatic, alicyclic, aromatic or alkyl substituted aromatic hydrocarbon, or heterocyclic; $D^1$ and $D^2$ are donor atoms or groups; X is an anionic group, L is a neutral donor group; n=m=zero or 1; y and z are zero or integer such that X and L satisfy valency/oxidation state of M, (2) a catalyst-activating support which is a solid particulate substance, insoluble in hydrocarbons, comprising at least magnesium and aluminum atoms and hydrocarbyloxy groups containing 1 to 20 carbon atoms, the molar ration of Mg/Al being in the range 1.0 to 300 and the molar ratio of hydrocarbyloxy groups to aluminum atoms being in the range 0.5 to 2.0, and optionally, (3) an additional activator selected from aluminum alkyl and boron compounds.

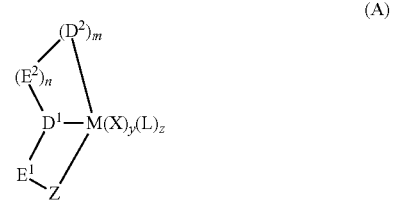

(A)

25 Claims, No Drawings

POLYMERISATION AND OLIGOMERISATION CATALYSTS

This application is the U.S. National Phase of International Application PCT/GB2005/002904, filed Jul. 25, 2005, which designated the U.S. PCT/GB2005/002904 claims priority to British Application No. 0418022.0 filed 12 Aug. 2004. The entire content of these applications are incorporated herein by reference.

The present invention relates to transition metal-based polymerisation and oligomerisation catalysts and to their use in the polymerisation, copolymerisation and oligomerisation of olefins.

The use of certain transition metal compounds to polymerise 1-olefins, for example, ethylene or propylene, is well established in the prior art. The use of Ziegler-Natta catalysts, for example, those catalysts produced by activating titanium halides with organometallic compounds such as triethylaluminium, is fundamental to many commercial processes for manufacturing polyolefins. Over the last three decades, advances in the technology have led to the development of Ziegler-Natta catalysts which have such high activities that olefin polymers and copolymers containing very low concentrations of residual catalyst can be produced directly in commercial polymerisation processes. The quantities of residual catalyst remaining in the produced polymer are so small as to render unnecessary their separation and removal for most commercial applications. Such processes can be operated by polymerising the monomers in the gas phase, or in solution or in suspension in a liquid hydrocarbon diluent, or, in the case of propylene in bulk.

Commodity polyethylenes are commercially produced in a variety of different types and grades. Homopolymerisation of ethylene with transition metal based catalysts leads to the production of so-called "high density" grades of polyethylene. These polymers have relatively high stiffness and are useful for making articles where inherent rigidity is required. Copolymerisation of ethylene with higher 1-olefins (eg butene, hexene or octene) is employed commercially to provide a wide variety of copolymers differing in density and in other important physical properties. Particularly important copolymers made by copolymerising ethylene with higher 1-olefins using transition metal based catalysts are the copolymers having a density in the range of 0.91 to 0.93. These copolymers which are generally referred to in the art as "linear low density polyethylene" are in many respects similar to the so-called "low density" polyethylene produced by the high pressure free radical catalysed polymerisation of ethylene. Such polymers and copolymers are used extensively in the manufacture of flexible blown film.

Polypropylenes are also commercially produced in a variety of different types and grades. Homopolymerisation of propylene with transition metal based catalysts leads to the production of grades with a wide variety of applications. Copolymers of propylene with ethylene or terpolymers with ethylene and higher 1-olefins are also useful materials, often used in film applications.

In recent years the use of certain metallocene catalysts (for example biscyclopentadienylzirconiumdichloride activated with alumoxane) has provided catalysts with potentially high activity. Other derivatives of metallocenes have been shown to be potentially useful for producing polypropylene with good activity, molecular weight and tacticity control. However, metallocene catalysts of this type suffer from a number of disadvantages, for example, high sensitivity to impurities when used with commercially available monomers, diluents and process gas streams, the need to use large quantities of expensive alumoxanes to achieve high activity, difficulties in putting the catalyst on to a suitable support and synthetic difficulties in the production of more complex catalyst structures suitable for polymerising propene in a tactic manner.

Olefin oligomerisation is also a commercially important process, leading to the production of 1-olefins (1-hexene, 1-octene, 1-decene, etc) that find utility in a wide range of applications, for example as comonomers for linear low density polyethylene, monomers for poly(1-olefins) and starting materials for surfactants. Catalysts based on a wide range of metal complexes may be used for this process and typically produce a so-called "Schulz-Flory" distribution of 1-olefins. More recently catalysts have emerged that selectively produce only 1-hexene by a distinctive trimerisation mechanism. Typically the final distribution of 1-olefins produced is of importance commercially.

WO 2004/083263 published in the name of BP Chemicals on 30 Sep. 2004, which is after the date of filing of the priority document of the present Patent Application, relates to a novel polymerisation catalyst comprising (1) a transition metal compound of Formula A, and optionally (2) a suitable activator,

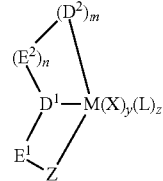

Formula A wherein Z is a five-membered heterocyclic group containing at least one carbon atom, at least one nitrogen atom and at least one other selected from nitrogen, sulphur and oxygen; M is a metal from Group 3 to 11 or lanthamide; E1 and E2 are divalent groups, eg hydrocarbyl; D1 and D2 are donor atoms or groups; X is an anionic group, L is a neutral donor group; n=m=zero or 1; y and z are zero or integers such that the number of X and L groups satisfy the valency and oxidation state of the metal M.

WO04/4037870 relates to a carrier component suitable as a polymerisation catalyst, which is insoluble in hydrocarbon solvent, is in the form of solid fine particles having an average particle size of 3 to 80 μm, and contains a magnesium atom, an aluminium atom, and a $C_{1-20}$ alkoxy group simultaneously, wherein the molar ratio of magnesium atom to aluminium atom is in the range 1.0 to 300, and the molar ratio of alkoxy groups to aluminium atom is in the range of 0.05 to 2.0. The carrier component is used with, for example, a transition metal complex component having the general formula I to III below

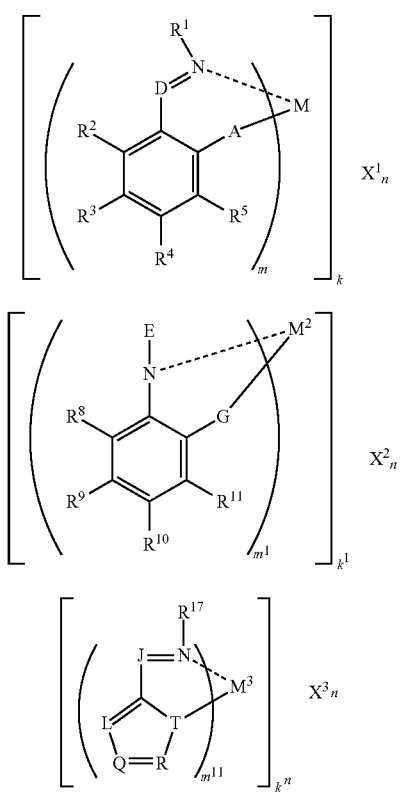

wherein N...M indicates that the two elements may or may not be coordinated. M is selected from a transition metal of groups 3 to 11 (including lanthamide). "A" can be O, S or N, and "D" can be N or P. "G" can be O, S or N and "E" is NR. "J" is N, P or NR, "T" is N or P and "L" is N, P or NR. "Q" is N, P or CR. All the R groups can be, for selected from, for example hydrogen or hydrocarbyl or other substituents. The combination of the support and the transition metal component form a catalyst suitable for polymerising olefins.

An object of the present invention is to provide a catalyst suitable for polymerising or oligomerising monomers, for example, olefins, cycloolefins or diolefins, and especially for polymerising or oligomerising ethylene alone or propylene alone, or for copolymerising ethylene with higher 1-olefins with high activity. A further object of the invention is to provide an improved process for the polymerisation of olefins. Yet another object of the present invention is to provide novel complexes based on certain transition metals. The catalysts described here show extremely high activity for polymerisation and oligomerisation which leads to many benefits including lower catalyst loadings in a commercial process and lower catalyst residues in the final product.

The present invention provides a polymerisation catalyst composition comprising (1) a transition metal compound having the following Formula A, Formula A

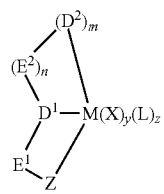

wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 11 of the Periodic Table or a lanthamide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; X is an anionic group, L is a neutral donor group; n=m=zero or 1; y and z are independently zero or integers such that the number of X and L groups satisfy the valency and oxidation state of the metal M, (2) a catalyst-activating support which is a solid particulate substance, insoluble in hydrocarbons, comprising at least magnesium and aluminium atoms and hydrocarbyloxy groups containing 1 to 20 carbons atoms, the molar ratio of Mg/Al being in the range 1.0 to 300 and the molar ratio of hydrocarbyloxy groups to aluminium atoms being in the range 0.05 to 2.0, and optionally, (3) an additional activator selected from aluminium alkyl activators and boron compound activators.

Preferably the average particle size of the support material is in the range 3 to 80 micrometers (μm), more preferably 5 to 60 micrometers.

Preferably the divalent groups $E^1$ and $E^2$ are not linked other than through the donor atom or group $D^1$. This can only occur, of course, when n=1.

At least one of the atoms present in the ring of the five-membered heterocyclic group Z is preferably bonded directly to $E^1$ and preferably a second atom in the ring is bonded directly to M. Most preferably the atom in the five-membered ring bonded directly to $E^1$ is adjacent to a second atom in said ring, said second atom being bonded directly to M.

The five-membered heterocyclic group Z preferably contains at least 2 carbon atoms in its ring and more preferably at least 3 carbon atoms in its ring. Examples of suitable 5-membered heterocyclic groups are (but are not restricted to):

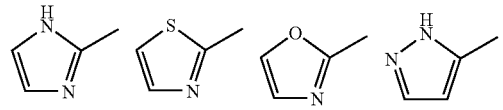

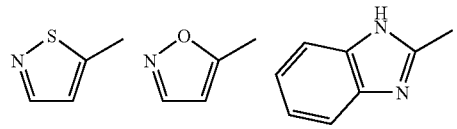

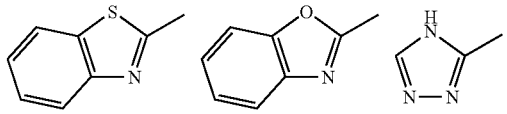

-continued

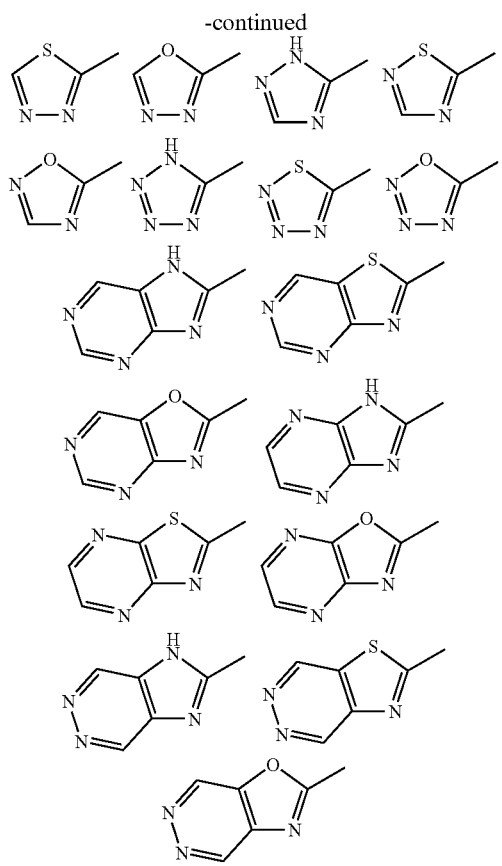

In a preferred embodiment of the present invention Z, in Formula A, is specifically an imidazole-containing group Thus, the present invention further provides a novel polymerisation catalyst comprising
(1) a transition metal compound having the following Formula A, $$\begin{array}{c}(D^2)_m\\(E^2)_n\\D^1-M(X)_y(L)_z\\E^1\\Z\end{array}$$

Formula A wherein Z is specifically an imidazole-containing group; M is a metal from Group 3 to 11 of the Periodic Table or a lanthamide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M,
(2) a catalyst-activating support which is a solid particulate substance, insoluble in hydrocarbons, comprising at least magnesium and aluminium atoms and hydrocarbyloxy groups containing 1 to 20 carbons atoms, the molar ratio of Mg/Al being in the range 1.0 to 300 and the molar ratio of hydrocarbyloxy groups to aluminium atoms being in the range 0.05 to 2.0, and optionally,
(3) an additional activator selected from aluminium alkyl activators and boron compound activators.

Preferably the average particle size of the support material is in the range 3 to 80 micrometers (μm), more preferably 5 to 60 micrometers.

$D^1$ and/or $D^2$ are donor atoms or groups containing at least one donor atom. $D^1$ and/or $D^2$ can be, for example, groups having the same formula as recited for group Z. For example $D^1$ and/or $D^2$ can be groups comprising a five-membered heterocyclic group containing at least 2 carbon atoms in its ring and more preferably at least 3 carbon atoms in its ring. $D^1$ and/or $D^2$ can be imidazole-containing groups if desired. When $D^1$ and/or $D^2$ are an imidazole-containing group this or these can be identical with Z. In a preferred embodiment $D^2$ and Z are identical imidazole containing groups.

The imidazole-containing group Z is preferably a group of formula I, II or III

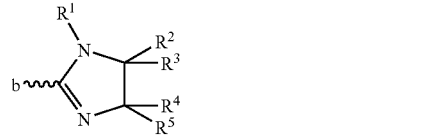

Formula I

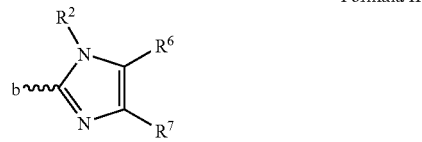

Formula II

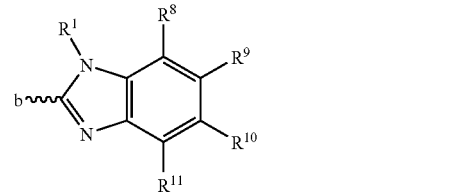

Formula III $R^1$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. The "free" valence bond indicated by "b" on the left of Formulae I, II and III provides at least one of the links of E into the rest of Formula A. The other link or links are preferably provided by at least one of the nitrogen atoms in the imidazole-containing group, i.e. the bond shown between Z and M in Formula A is provided by a bond connected from M to one of the nitrogen atoms of the group depicted in Formula I, II or III. The defined groups $R^1$ to $R^{11}$ of Formulae I, II and III preferably contain 1 to 30, more preferably 2 to 20, most preferably 2 to 12 carbon atoms. Examples of suitable aliphatic hydrocarbon groups are methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted-aromatic hydrocarbon groups are benzyl, tolyl, mesityl, 2,6- diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4$($CH_3$)), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$C_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl.

Further suitable imidazole-containing groups may be obtained by removal of substituent $R_1$, for example by deprotonation when $R^1$ is hydrogen, to give formally monoanionic imidazole-containing groups.

It is preferred that the imidazole-containing group has a structure described in formula III (a "benzimidazole"). $R^1$ is preferably hydrogen, an aliphatic hydrocarbon group, an aromatic hydrocarbon group or is removed to give a formally monoanionic benzimidazole group. $R^8$ to $R^{11}$ are preferably hydrogen, an aliphatic hydrocarbon group or an aromatic hydrocarbon group.

$E^1$ and $E^2$ (hereinafter referred to as "E") can be the same or different. E is independently selected from divalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. Examples of suitable divalent groups E are —$CH_2$—, —$CH_2CH_2$—, —$CH_2CH_2CH_2$—, 1,2-phenylene, trans-1,2-cyclopentane, trans-1,2-cyclohexane, 2,3-butane, 1,1'-biphenyl, 1,1'-binaphthyl, and —$Si(Me)_2$—. It is preferred that E is an aliphatic or aromatic hydrocarbon group. More preferably the divalent group E is —$CH_2$—.

$D^1$ and $D^2$ can be the same or different donor groups, for example oxygen, sulfur, an amine, an imine or a phosphine. Preferably $D^1$ and $D^2$ are selected from oxygen, sulfur, an amine of formula —$N(R^{12})$— or a phosphine of formula —$P(R^{13})$— wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups. Alternatively $R^{12}$ or $R^{13}$ may be removed, for example by deprotonation when they are hydrogen, to give a formally monoanionic fragment; or if both $R^{12}$ or $R^{13}$ are removed they provide a formally dianionic fragment. More preferably $D^2$ is an amine of formula —$N(R^{12})$— as defined above. $R^{12}$ is preferably hydrogen, an aliphatic hydrocarbon, an aromatic hydrocarbon or a further imidazole containing group. Preferably $D^2$ is an imidazole-containing group.

M is preferably a metal selected from Groups 3 to 11 of the periodic table, preferably from Groups 3 to 7, more preferably selected from Sc, Ti, Zr, Hf, V, Nb, Ta, Cr, Mo, W, Mn and most preferably V, Cr, Ti, Zr and Hf The anionic group X can be, for example, a halide, preferably chloride or bromide; or a hydrocarbyl group, for example, methyl, benzyl or phenyl; a carboxylate, for example, acetate or an acetylacetonate; an oxide; an amide, for example diethyl amide; an alkoxide, for example, methoxide, ethoxide or phenoxide; or a hydroxyl. Alternatively, X can be a non-coordinating or weakly-coordinating anion, for example, tetrafluoroborate, a fluorinated aryl borate or a triflate. The anionic groups X may be the same or different and may independently be monoanionic, dianionic or trianionic.

The neutral donor group L can be, for example, a solvate molecule, for example diethyl ether or THF; an amine, for example, diethyl amine, trimethylamine or pyridine; a phosphine, for example trimethyl phosphine or triphenyl phosphine; or water; or an olefin or a neutral, conjugated or non-conjugated diene, optionally substituted with one or more groups selected from hydrocarbyl or trimethylsilyl groups, said group having up to 40 carbon atoms and forming a pi-complex with M. When L is a diene ligand, it can be, for example s-trans-$\eta^4$-1,4-diphenyl-1,3-butadiene; s-trans-$\eta^4$-3-methyl-1,3-pentadiene; s-trans-$\eta^4$-1,4-dibenzyl-1,3-butadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-1,4-bis(trimethylsilyl)-1,3-butadiene; s-trans-$\eta^4$-1,4-diphenyl-1,3-butadiene; s-cis-$\eta^4$-3-methyl-1,3-pentadiene; s-cis-$\eta^4$-1,4-dibenzyl-1,3-butadiene; s-cis-$\eta^4$-2,4-hexadiene; s-cis-$\eta^4$-1,3-pentadiene; s-cis-$\eta^4$-1,4-ditolyl-1,3-butadiene; or s-cis-$\eta^4$-1,4-bis(trimethylsilyl)-1,3-butadiene, said s-cis isomers forming a .pi.-bound diene complex;

The value of y depends on the formal charge on each group Z and D, the charge on the anionic group X and the oxidation state of the metal M. For example, if M is chromium in oxidation state +3, Z is a neutral group and both D groups are neutral, then y is 3 if X is a monoanionic group (eg. chloride); if M is chromium in oxidation state +3, the Z group is neutral, one D group is monoanionic and the other D is neutral, then y is 2 if all X groups are monoanionic groups (e.g. chloride).

The catalyst-activating hydrocarbon-insoluble support (2) present in the polymerisation catalyst of the present invention preferably contains a Mg/Al ratio in the range 40 to 150 and has a molar ratio of alkoxy to Al in the range 0.2 to 2.0.

The phrase "being insoluble in a hydrocarbon solvent" means that less than 2.0 wt %, preferably less than 1.0 wt % of the solid is soluble on boiling the solid in n-hexane at 1 bar pressure for 1 hour. Any soluble part present in the support can be removed, for example, by boiling the product in an inert solvent (eg a volatile hydrocarbon) and decanting or filtering the solid particulate product.

The term "alkoxy" is used in its broad sense to mean alkyl or aryloxy or substituted derivatives thereof, for example chloroalkoxy Thus the $C_1$ to $C_{20}$ alkoxy group in the carrier component can be for example methoxy, ethoxy, n-propoxy, i-propoxy, n-butoxy, sec-butoxy, t-butoxy or any other straight or branched chain alkoxy group containing 1 to 20 carbon atoms. Also suitable are, inter alia, benzoyloxy, phenylethoxy, phenoxy, ethylphenoxy, naphthoxy, and halogenated alkoxy derivatives and similar alkoxy compounds.

The molar ratio of magnesium atoms to aluminium atoms (Mg/Al) is preferably in the range 1 to 300, more preferably 30 to 250 for example 30 to 200, most preferably 40 to 150.

The molar ratio of alkoxy to aluminium (OR/Al) is preferably 0.05 to 2.0, more preferably 0.1 to 1.8, most preferably 0.2 to 1.0.

The average particle size of the support is preferably 3 to 60 microns.

The support is preferably prepared by at least partially dissolving a magnesium halide, preferably magnesium dichloride, in an alcohol containing 1 to 20 carbons atoms and contacting the product with an organoaluminium compound having the formula $AlR_nX_{3-n}$ wherein X is halogen or hydrogen and n is 1 to 3. Supports of this type are disclosed in WO 2004/037870 and for details of their preparation this disclosure provides useful information. The magnesium halide is preferably dissolved completely in the alcohol before reacting with the organoaluminium compound, heating or refluxing the mixture if necessary. Any undissolved magnesium halide is preferably separated before reacting the solution with the organoaluminium compound. The solution thus prepared by dissolving the magnesium halide in the alcohol can be directly reacted with the organoaluminium compound, or if desired, some or all of the residual alcohol can be removed, for example by evaporation techniques to leave a solid or semisolid product before reacting with the organoaluminium compound.

The reaction between the alcohol and the magnesium halide can be carried out in the presence of an inert diluent, eg a volatile liquid hydrocarbon, if desired. The reaction is preferably carried out with heating, eg at 50 to 150° C. and with agitation, eg stirring. The product of reacting the alcohol and the magnesium halide can be a solution, a slurry or a solid. Preferably the product is a solution in the alcohol or in a hydrocarbon diluent. Examples of alcohols that can be employed to make the catalyst-activating hydrocarbon-insoluble support are $R^1OH$ wherein $R^1$ is aliphatic, alicyclic or aralkyl, for example, methyl, ethyl, propyl, isopropyl, n-butyl, sec-butyl, tert butyl, n-pentyl, n-hexyl, n-octyl, n-decyl, cyclohexyl, ethylcyclohexyl and benzyl Examples of organoaluminium compounds that can be employed to make the catalyst-activating hydrocarbon-insoluble support are $R_3Al$, $R_2AlX$ and $RAlX_2$ wherein R is preferably $C_1$ to $C_{20}$ hydrocarbyl, and X is chlorine or bromine, preferably chlorine. R is preferably selected from methyl, ethyl, propyl, isopropyl, n-butyl, sec-butyl, tert butyl, n-pentyl, n-hexyl, n-octyl and n-decyl.

Reacting the solid or preferably the solution with the organoaluminium compound using quantities having the aforerecited Mg/Al ratios produces a solid having the desired chemical characteristics. The organoaluminium compound is preferably employed as a solution in a hydrocarbon solvent, for example, hexane, decane, xylene or toluene. The reaction is preferably performed by adding a solution of the organoaluminium compound to the product of reacting the magnesium halide with the alcohol. The reaction is preferably carried out with stirring. The reaction is generally exothermic and thus cooling can be employed if desired. The reaction can be carried out over a period of time for example from 5 minutes to 5 hours. The mole ration of aluminium to magnesium employed in this reaction is suitably 0.1 to 50, preferably 0.5 to 30, more preferably 1 to 20, and most preferably 2 to 10.

The shape and size of the particles formed in the solid product are variable depending on the conditions used in their formation. To obtain particles of regular shape and uniform size it is desirable to use conditions that favour controlled and relatively slow/mild reaction and slow temperature change. Such conditions can involve, for example continuous or gradual addition of a solution of the organoaluminium compound to a solution of the magnesium halide/alcohol reaction product. Using such conditions it is generally relatively easy to obtain a product having narrow particle size distribution and of generally regular spherical or granular shape. The particle size of the product can be adjusted if desired by conventional methods, for examples, milling, sieving, pressing and the like. The catalyst-activating hydrocarbon-insoluble support and its preparation are suitably protected to exclude air and moisture. Preferably the preparation and storage are in an inert gas atmosphere.

The optional activator (3) for the catalyst of the present invention is suitably selected from organoaluminium compounds and organoboron compounds or mixtures thereof. Examples of organoaluminium compounds include trialkylaluminium compounds, for example, trimethylaluminium, triethylaluminium, tributylaluminium, tri-n-octylaluminium, ethylaluminium dichloride, diethylaluminium chloride, tris (pentafluorophenyl)aluminium and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear, cyclic and cage compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable organoboron compounds are dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]borate$, trityltetra (pentafluorophenyl)borate and tris(pentafluorophenyl)boron. Mixtures of organoaluminium compounds and organoboron compounds may be used.

In the preparation of the catalysts of the present invention the quantity of activating compound selected from organoaluminium compounds and organoboron compounds to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per atom of M present in the compound of Formula A. Mixtures of different activating compounds may be used.

In addition to the catalyst-activating hydrocarbon-insoluble support and the optional activator compound, it can be advantageous to employ catalytic quantities of certain halogenated compounds that are capable of promoting catalyst activity. Promotors of this type are especially useful in the case that the transition metal in the complex is vanadium. U.S. Pat. No. 5,191,042 discloses that certain vanadium-based catalysts activated with organoaluminium compounds can be promoted using a variety of halogenated organic compounds, for example, carbon tetrachloride, hexachloroethylene, benzylbromide, benzylchloride and 2,3- or 1,3-dichloropropylene. Other examples of halogenated organic compounds that can be used in this manner are ethyl trichloroacetate, chloroform ($CHCl_3$) and n-butylchloride. U.S. Pat. No. 5,191,042 also refers to the disclosure of Cooper (T. A Cooper, Journ. Am. Chem. Soc., 4158 (1973), which defines in Table 1 an organic halide activity index based on the ability of the halide to oxidize certain vanadium compounds under standard conditions. For example, carbon tetrachloride is assigned a reactivity of 1 in tetrahydrofuran at 20° C., and other listed halogenated organic compounds have reactivities of from about 0.02 to greater than 200 relative to carbon tetrachloride. When it is desired to use a halogenated promotor, it is preferred to use those having a Cooper Index ranging from about 0.01 up to about 30. The use of such promoters, especially in combination with vanadium-based catalysts is generally well known in the art, and for details of use of the such promoters reference may be made to U.S. Pat. No. 5,191,042 and to other prior art in this field. In the present invention it is possible to employ any halogenated organic compound as a promoter, but the compounds mentioned above are preferred.

A preferred embodiment of the present invention provides a catalyst comprising (1) a transition metal compound having the following Formula B or C,

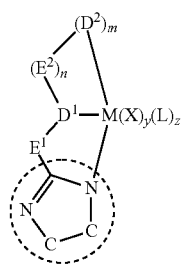

Formula B

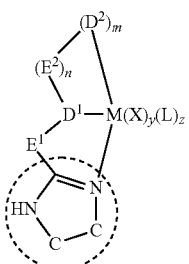

Formula C wherein the imidazole nucleus shown within the dotted circle is selected from the divalent groups represented by the Formulae Ia, IIa, IIIa, IVa, Va and VIa,

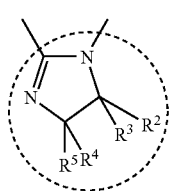

Ia

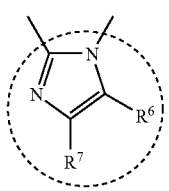

IIa

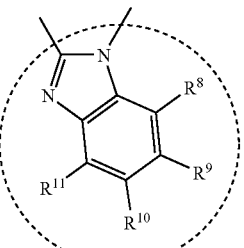

IIIa

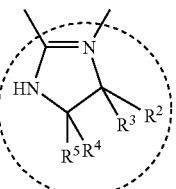

IVa

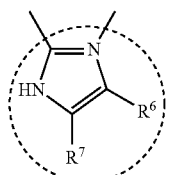

Va

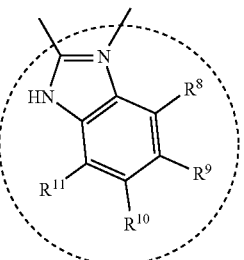

VIa wherein M is a metal from Group 3 to 11 of the Periodic Table or a lanthamide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M, wherein the groups $R^2$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups, (2) a catalyst-activating support which is a solid particulate substance, insoluble in hydrocarbons, comprising at least magnesium and aluminium atoms and hydrocarbyloxy groups containing 1 to 20 carbons atoms, the molar ratio of Mg/Al being in the range 1.0 to 300 and the molar ratio of hydrocarbyloxy groups to aluminium atoms being in the range 0.05 to 2.0, the average particle size of the support being in the range 3 to 80 micrometers (μm), and optionally, (3) an additional activator selected from aluminium alkyl activators and boron compound activators.

M is preferably selected from Groups 3 to 7 of the periodic table.

Groups $R^2$ to $R^{11}$ are preferably selected from the groups defined above in relation to the Formula I, II, III, IV, V and VI groups.

In this preferred embodiment of the present invention, $D^1$ and $D^2$ can be the same or different donor groups, for example oxygen, sulfur, an amine, an imine or a phosphine. Preferably $D^1$ and $D^2$ are selected from oxygen, sulfur, an amine of formula $-N(R^{12})-$ or a phosphine of formula $-P(R^{13})-$ wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups.

Preferably $D^1$ is nitrogen for example $-NR^1-$ or $=N-$ or a nitrogen-containing group, for example $-N(R^1)-R^{20}-$ wherein $R^1$ represents a monovalent group and $R^{20}$ represents a divalent group derived from, for example, aliphatic hydrocarbon groups such as methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. $-OC_6H_5$), tolyloxy (i.e. $-OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. $-OC_6H_5$), tolyloxy (i.e. $-OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl Preferably $D^2$ is a imidazole group selected from the groups of Formula Ia, IIa and IIIa above.

As indicated above, the values of m and n in the present invention are such that m=n=zero or one. For the avoidance of doubt, this means that for a given complex, when m is zero, n is also zero. And when m is 1, n is also 1.

When m and n are zero in Formula A, the Formula reduces to Formula D, preferably to Formula E or Formula F

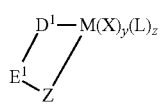

Formula D

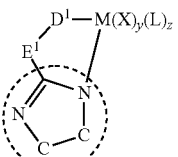

Formula E

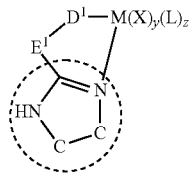

Formula F wherein D1, E1, Z, M, X, L, y and z are as defined above, and wherein the imidazole nucleus within the dotted circle is selected from the divalent groups represented by the Formulae Ia, IIa, IIIa, IVa, Va and VIa

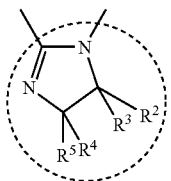

Ia

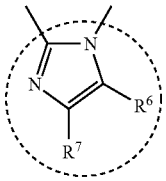

IIa

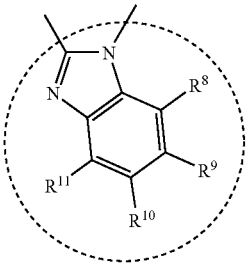

IIIa

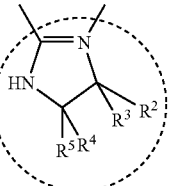

IVa

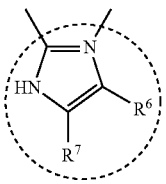

Va

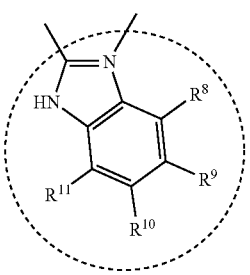
VIa
The following ligands represent some examples of those suitable for making the complexes of Formula C and D in accordance with the present invention.
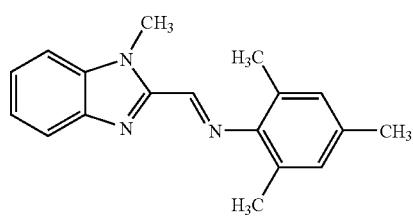
Formula 20
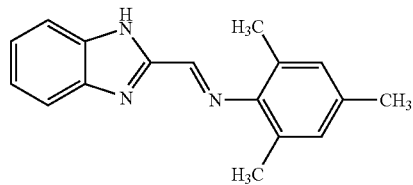
Formula 21
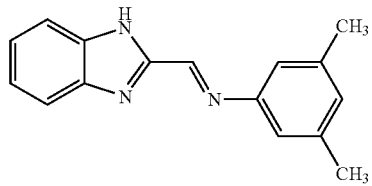
Formula 22
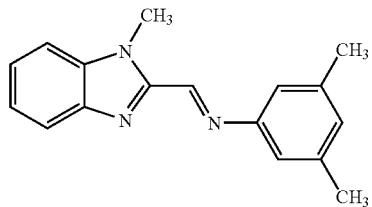
Formula 23
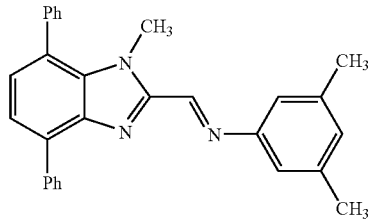
Formula 24
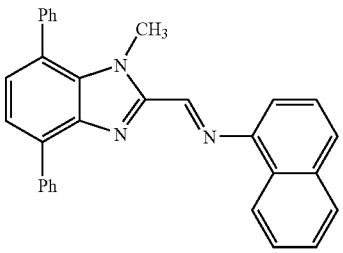
Formula 25
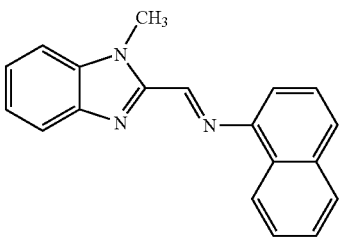
Formula 26
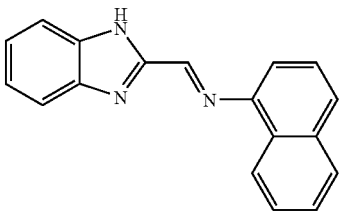
Formula 27
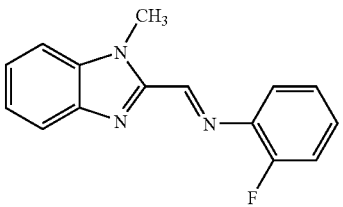
Formula 28
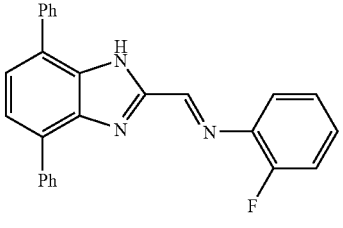
Formula 29
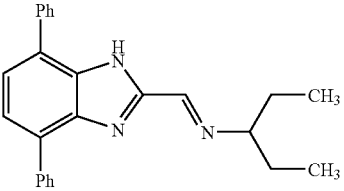
Formula 30
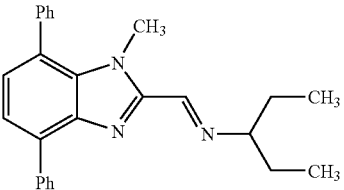
Formula 31

Formula 33
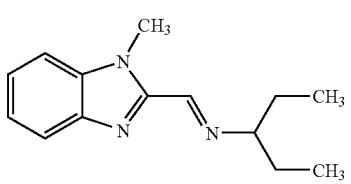
Formula 33
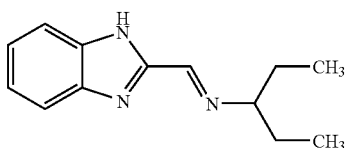
Formula 34
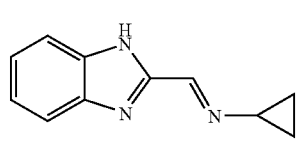
Formula 35
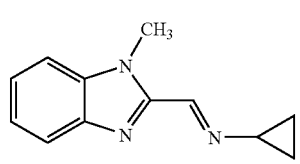
Formula 36
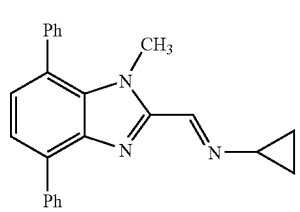
Formula 37
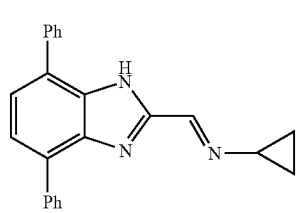
Formula 38
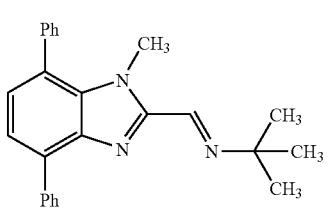
Formula 39
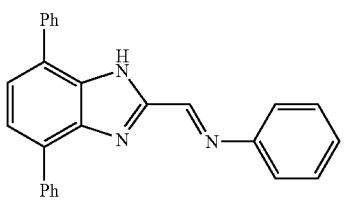
Formula 40
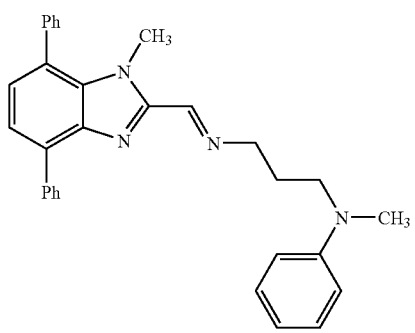
Formula 41
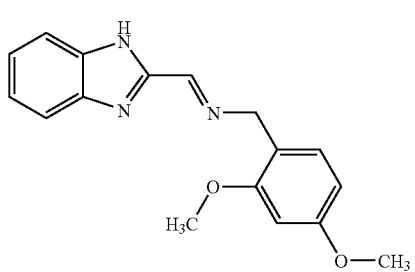
Formula 42
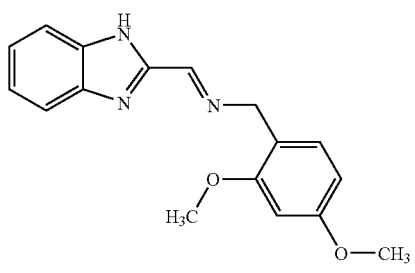
Formula 43
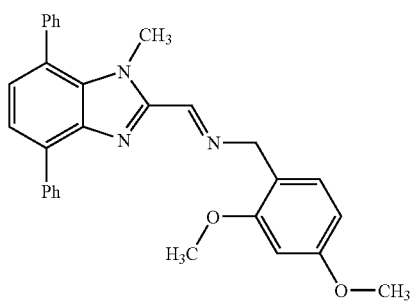
Formula 44
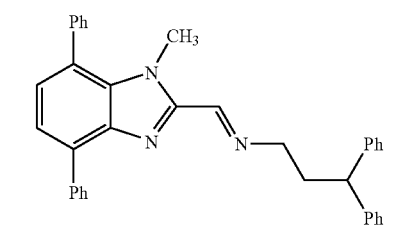
Formula 45
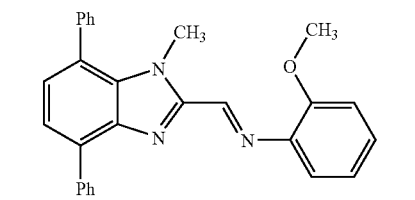

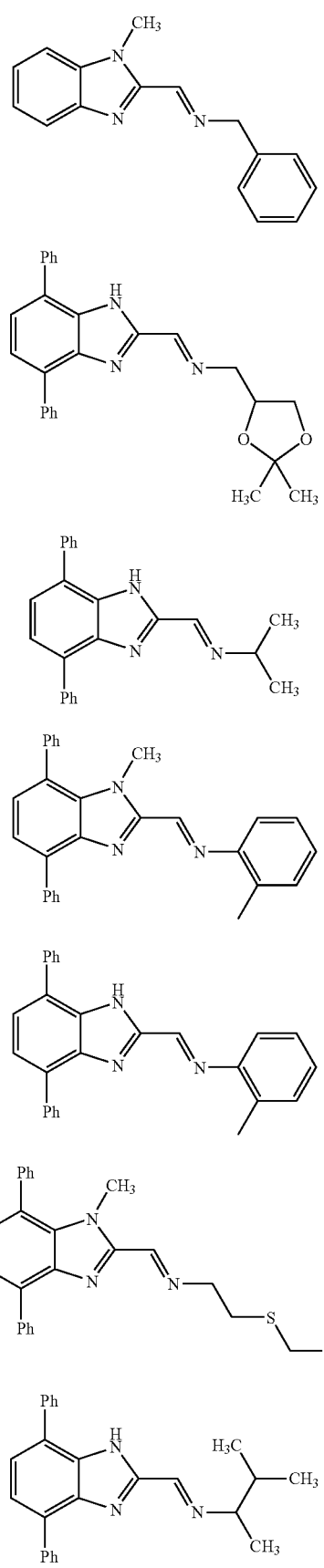
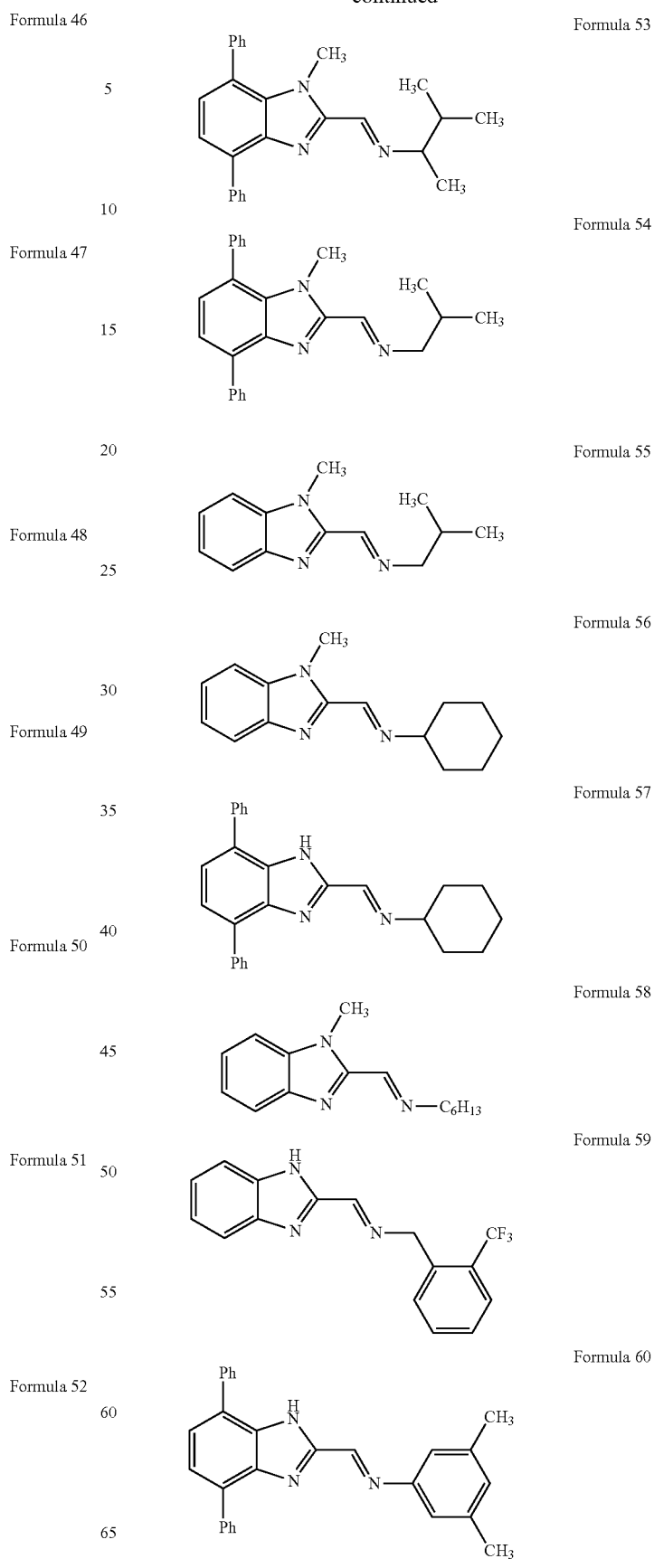

-continued
Formula 61
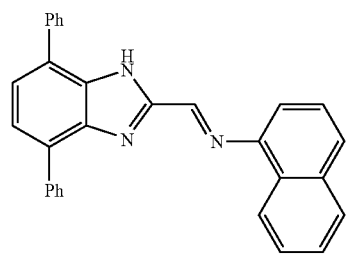
Formula 62
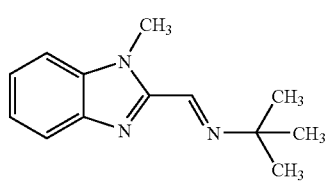
Formula 63
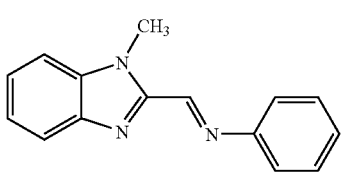
Formula 64
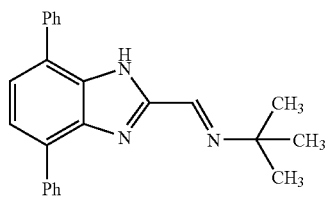
Formula 65
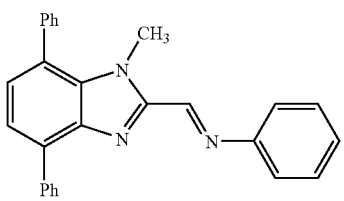
Formula 66
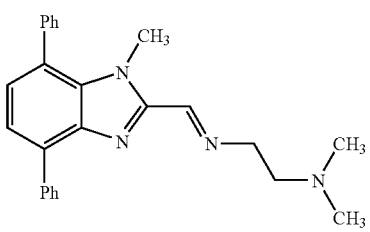
Formula 67
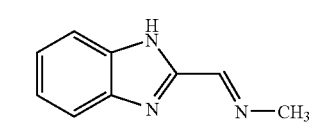
Formula 68
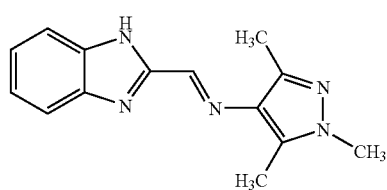
-continued
Formula 69
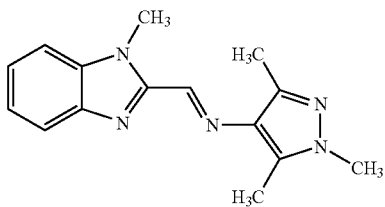
Formula 70
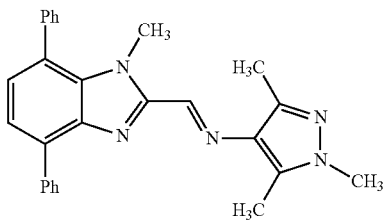
Formula 71
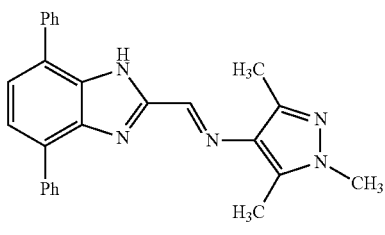
Formula 72
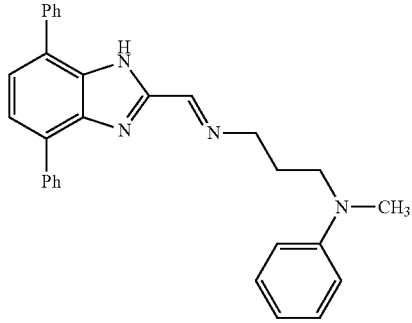
Formula 73
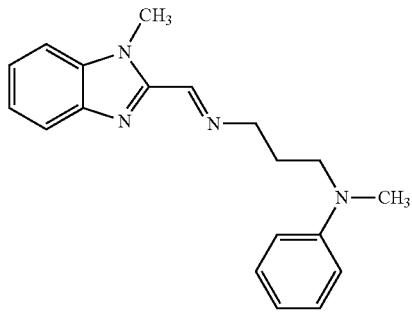
Formula 74
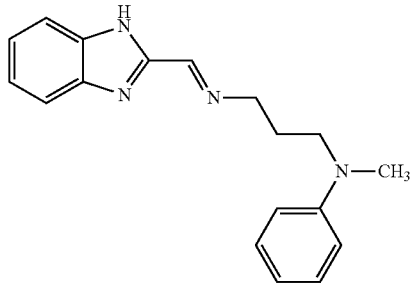

Formula 75
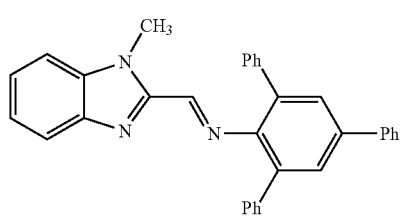
Formula 76
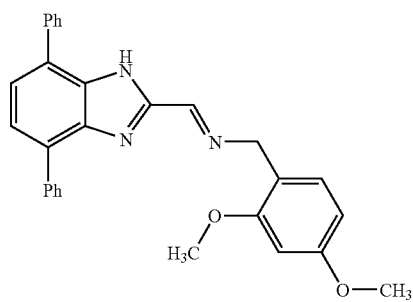
Formula 77
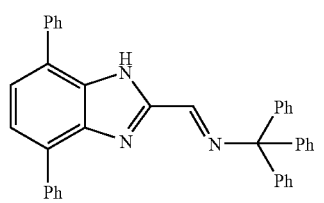
Formula 78
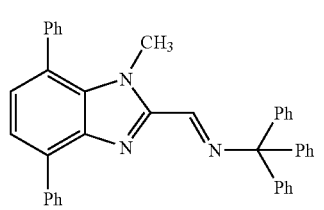
Formula 79
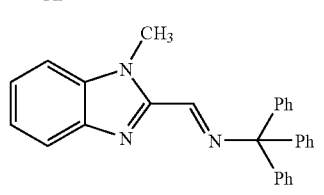
Formula 80
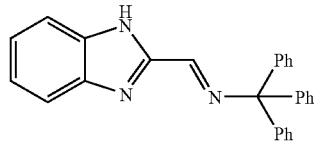
Formula 81
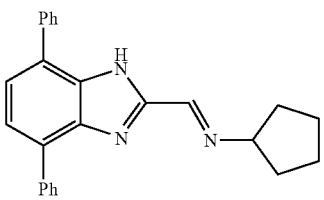
Formula 82
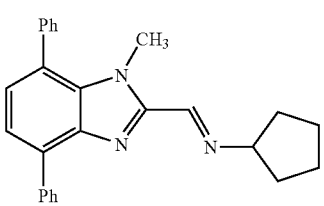
Formula 83
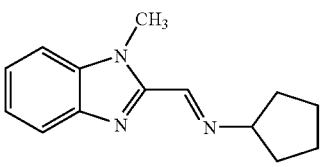
Formula 84
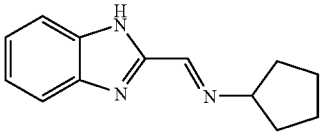
Formula 85
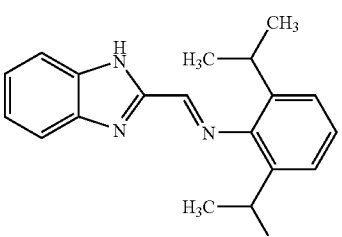
Formula 86
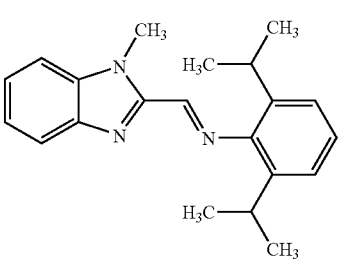
Formula 87
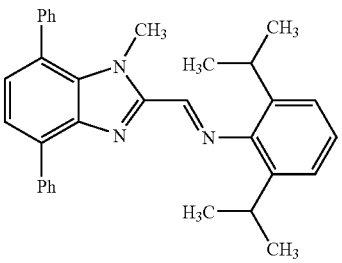
Formula 88
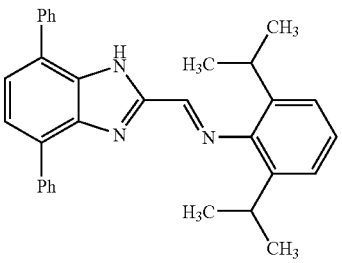
Formula 89
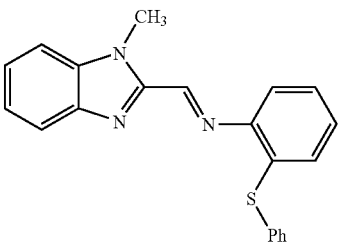

Formula 90
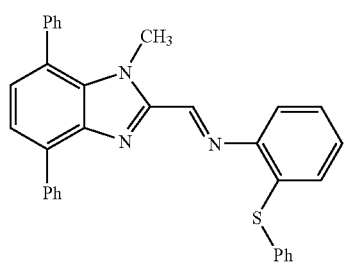
Formula 91
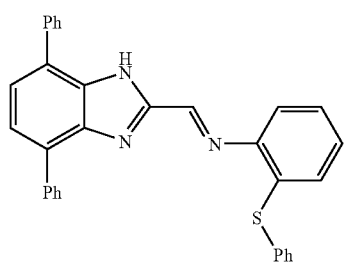
Formula 92
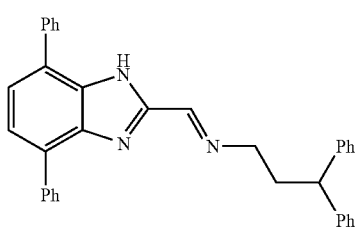
Formula 93
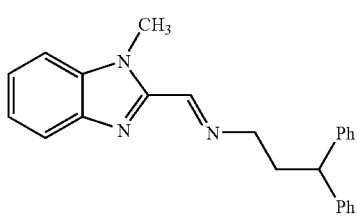
Formula 94
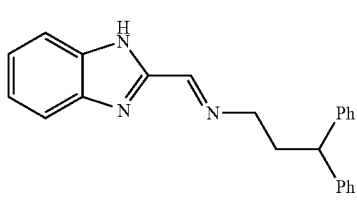
Formula 95
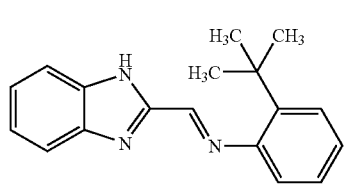
Formula 96
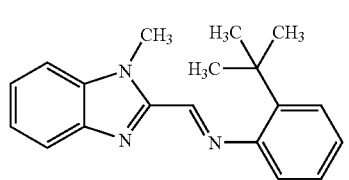
Formula 97
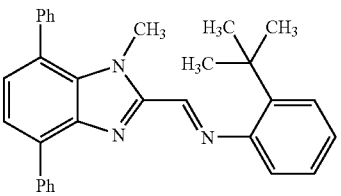
Formula 98
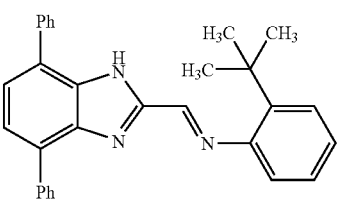
Formula 99
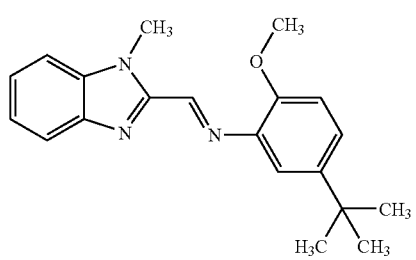
Formula 100
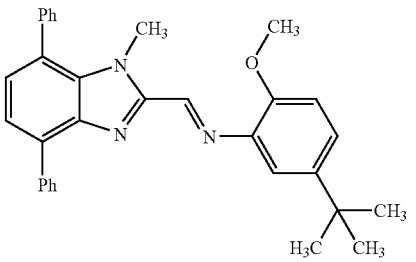
Formula 101
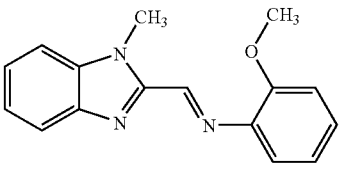
Formula 102
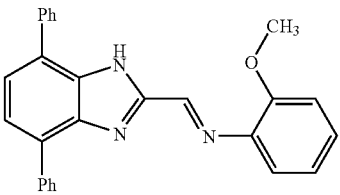
Formula 103
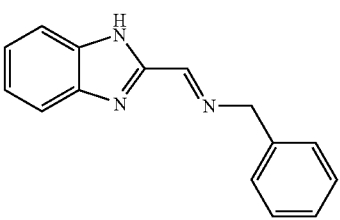

Formula 104
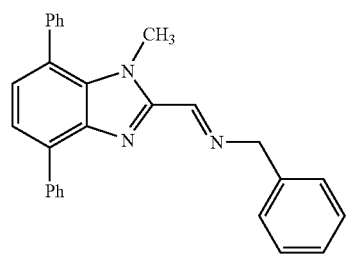
Formula 105
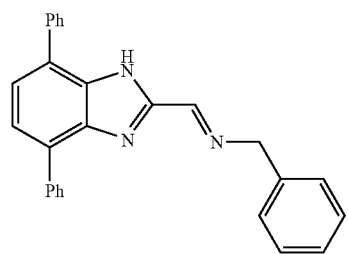
Formula 106
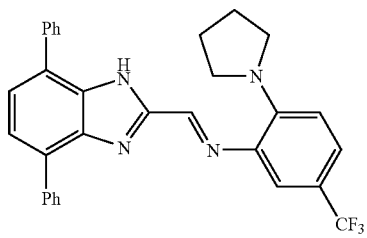
Formula 107
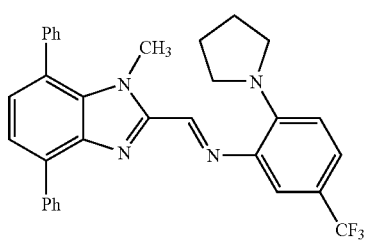
Formula 108
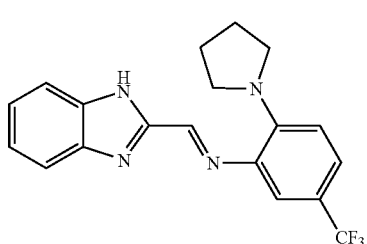
Formula 109
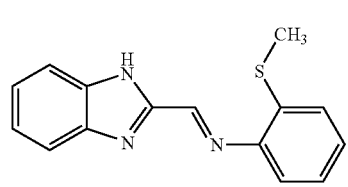
Formula 110
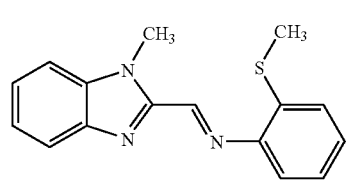
Formula 111
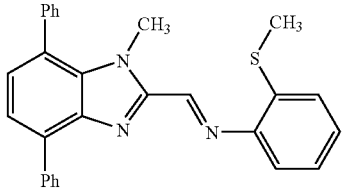
Formula 112
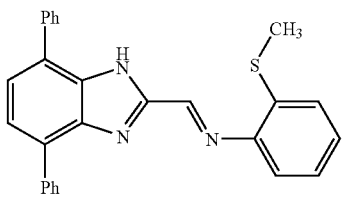
Formula 113
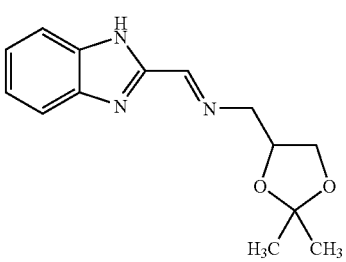
Formula 114
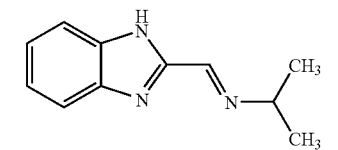
Formula 115
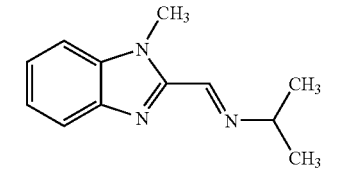
Formula 116
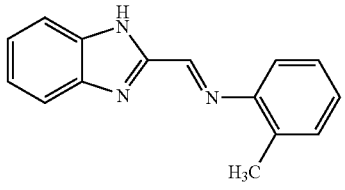
Formula 117
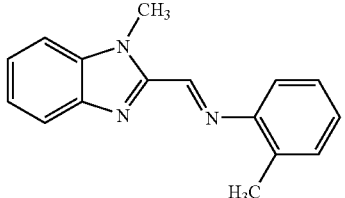
Formula 118
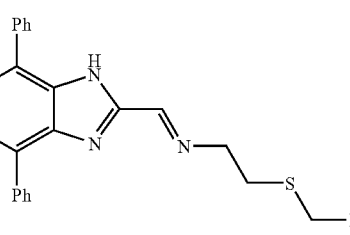

-continued
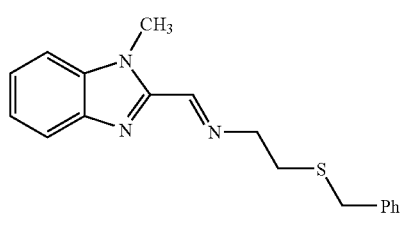
Formula 119
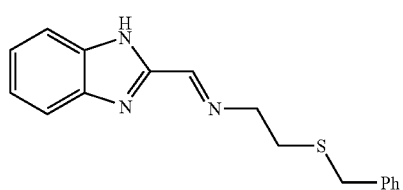
Formula 120
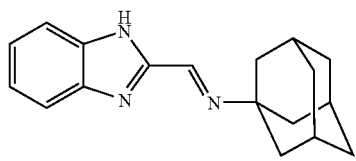
Formula 121
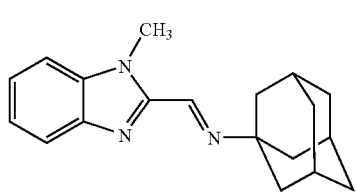
Formula 122
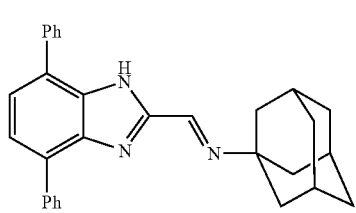
Formula 123
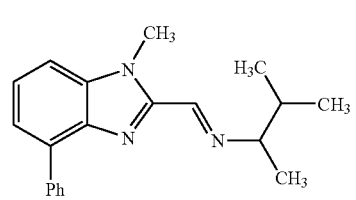
Formula 124
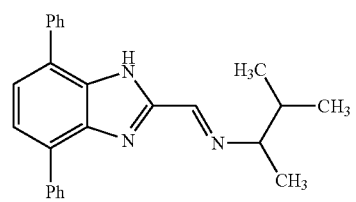
Formula 125
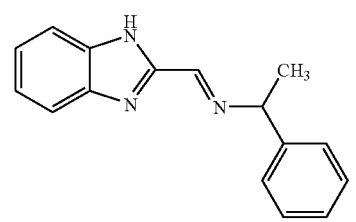
Formula 126
-continued
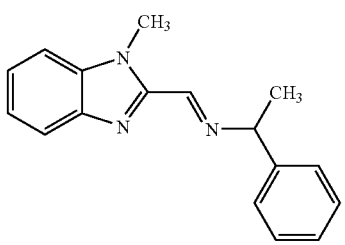
Formula 127
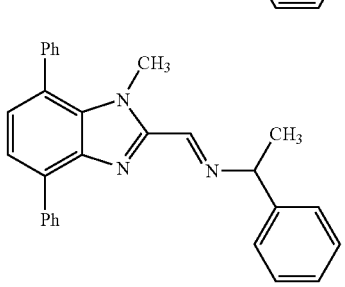
Formula 128
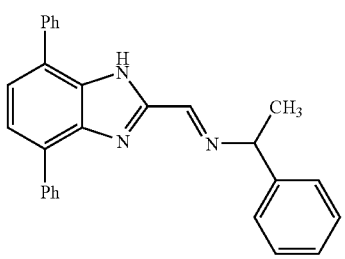
Formula 129
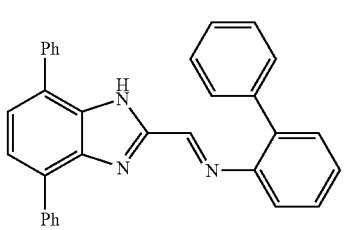
Formula 130
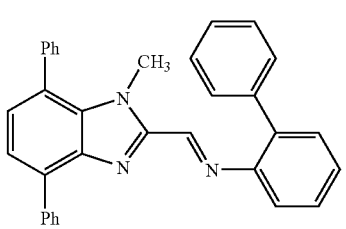
Formula 131
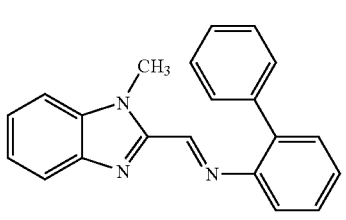
Formula 132
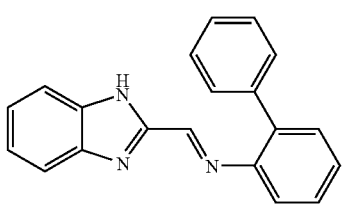
Formula 133

-continued
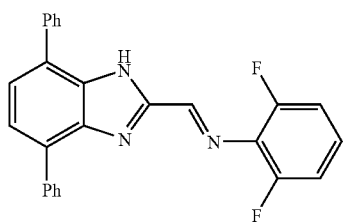
Formula 134
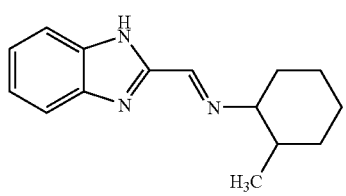
Formula 135
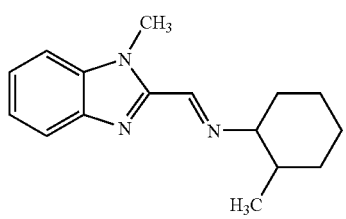
Formula 136
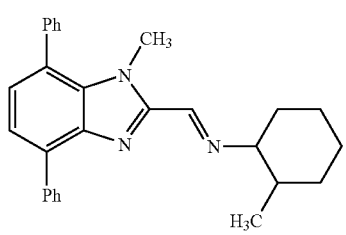
Formula 137
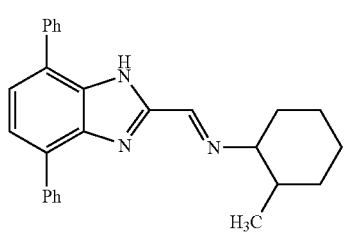
Formula 138
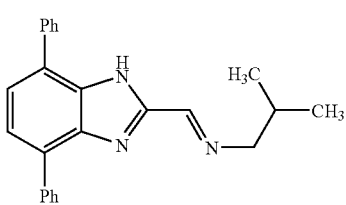
Formula 139
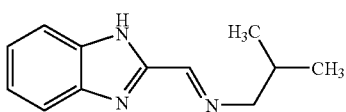
Formula 140
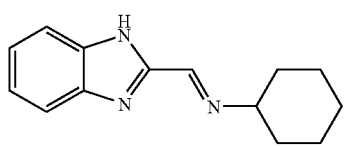
Formula 141
-continued
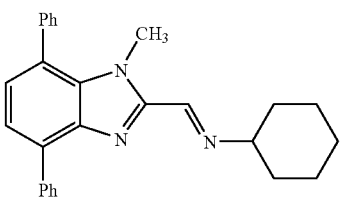
Formula 142
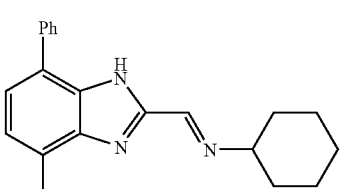
Formula 143
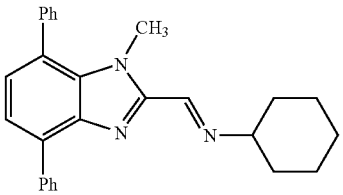
Formula 144
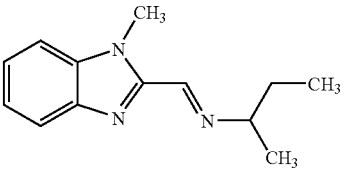
Formula 145
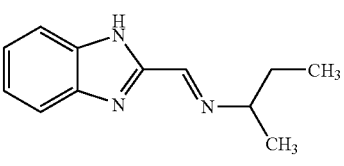
Formula 146
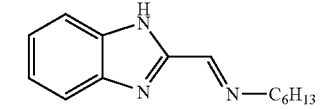
Formula 147
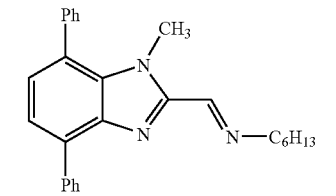
Formula 148
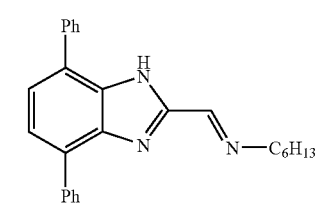
Formula 149

Formula 150
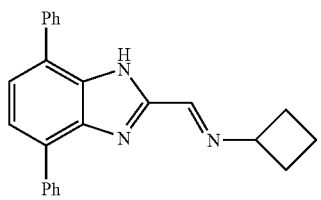

Formula 151
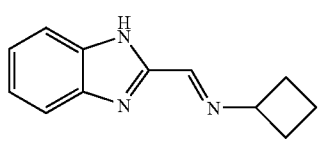

Formula 152
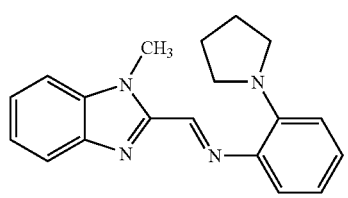

Formula 153
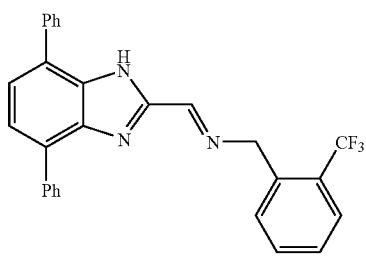

Formula 154
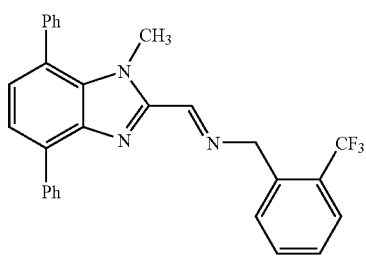

Formula 155
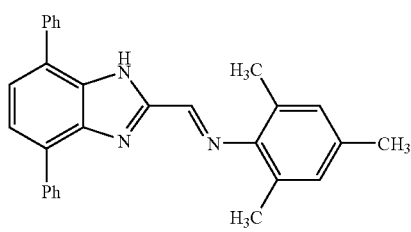

Formula 156
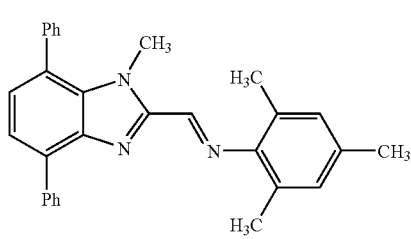

Formula 157
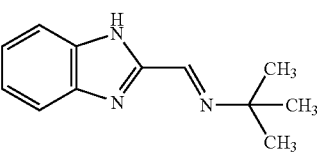

These ligands can be used to make a catalyst in accordance with the present invention wherein the transition metal is preferably titanium, zirconium, hafnium, vanadium or chromium.

The following are examples of transition metal complexes that can be employed in the catalyst of the present invention:

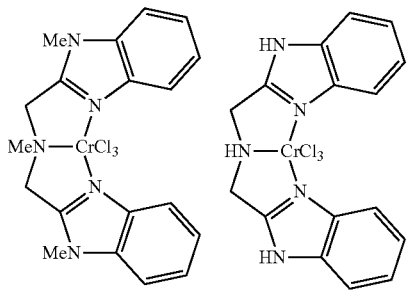

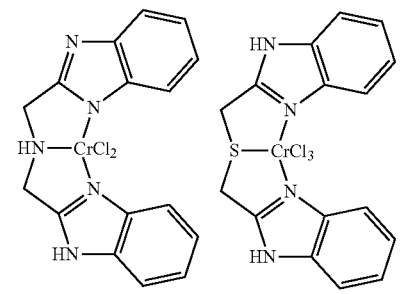

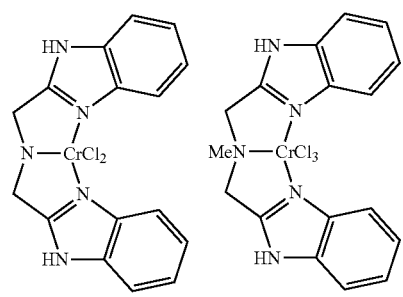

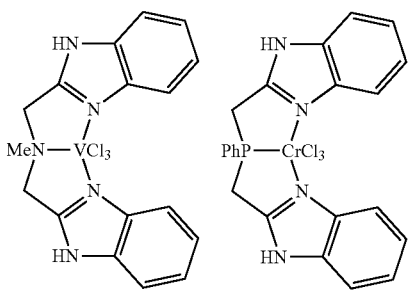

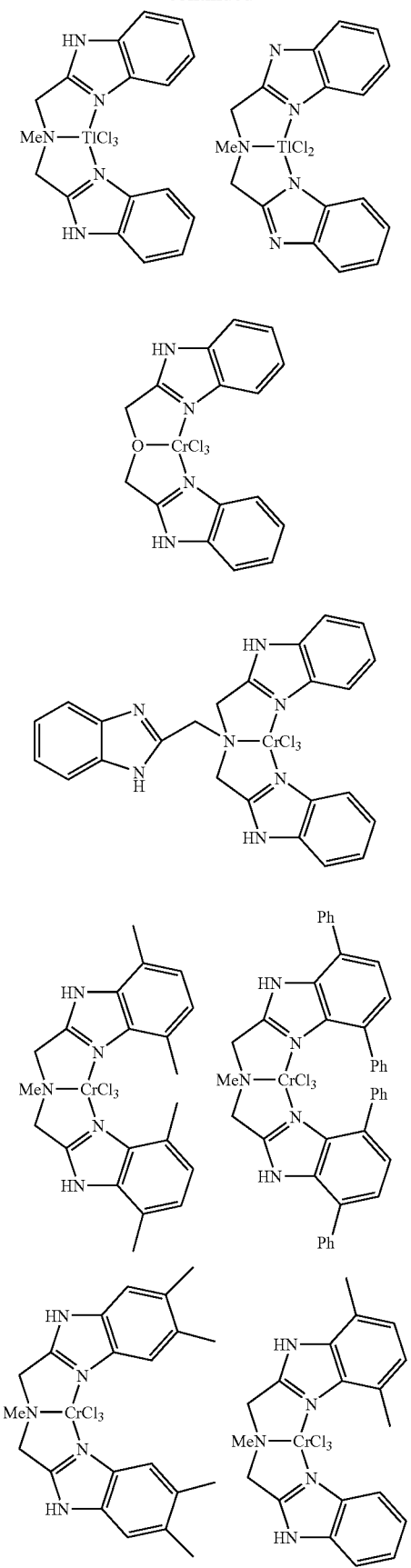
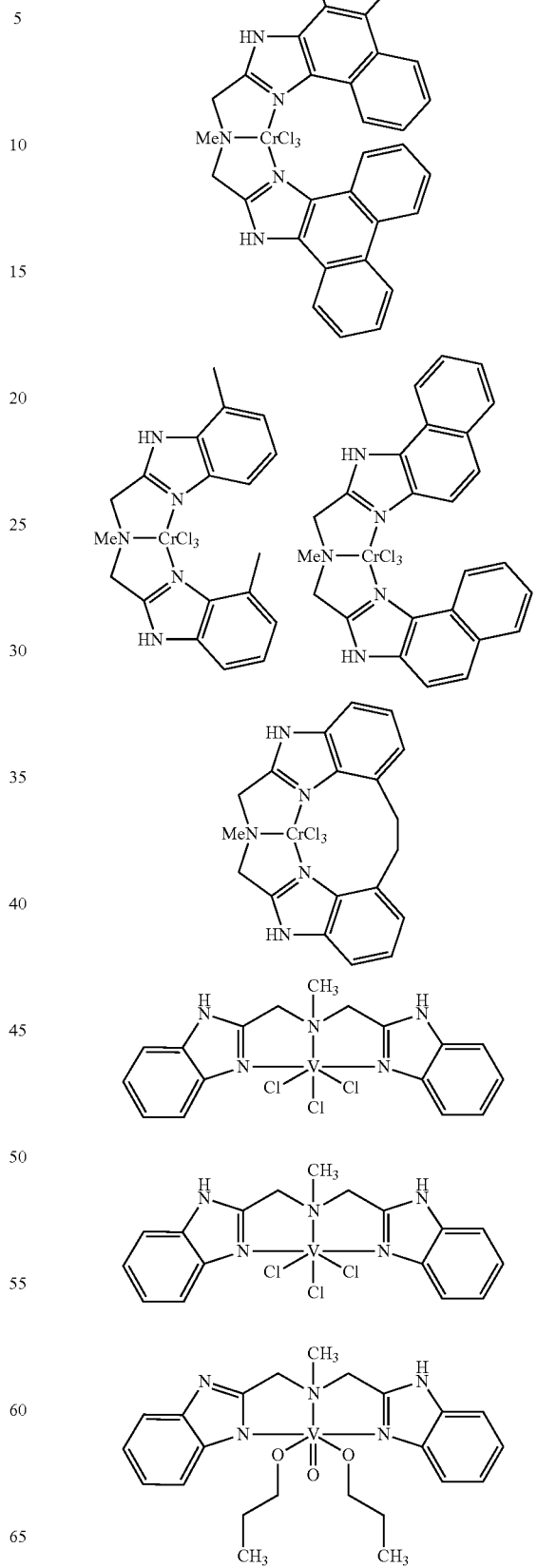

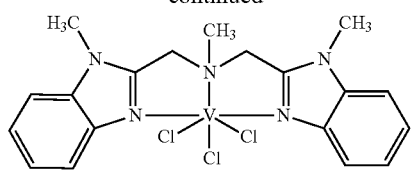
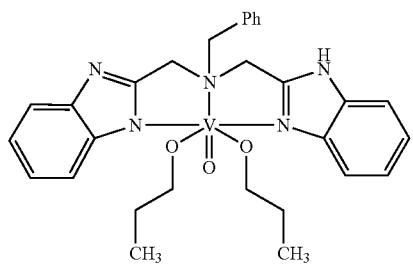
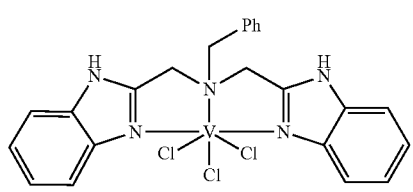
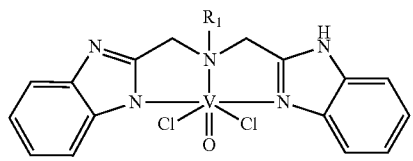
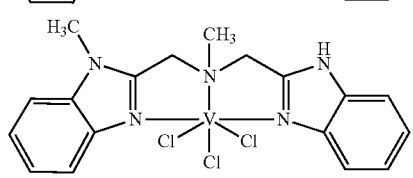
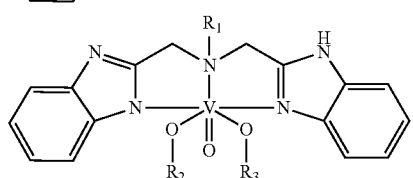
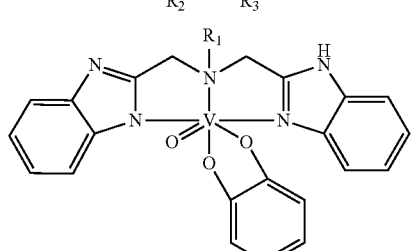
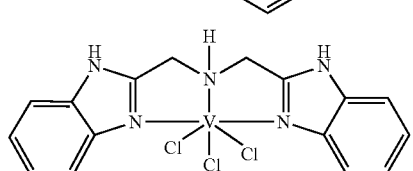
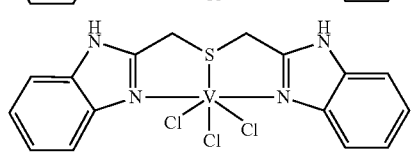
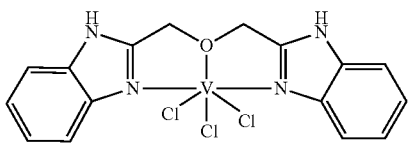
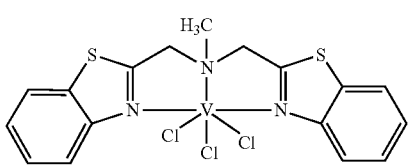
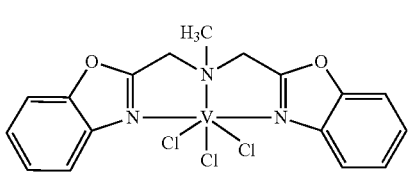
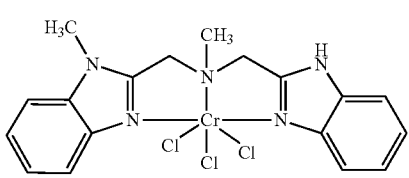
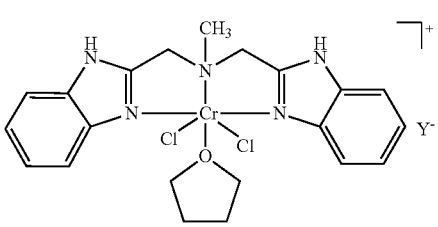
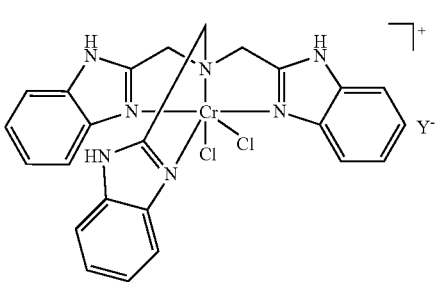
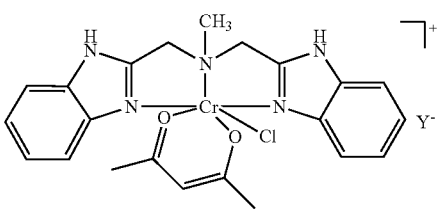
Y = Cl, SbF6, BF4, B(C6F5)4, etc
The following Formulae illustrate the transition metal compounds according to the present invention wherein L is a diene:

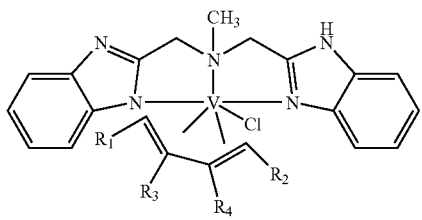

R1-R4 = alkyl, aryl, etc.

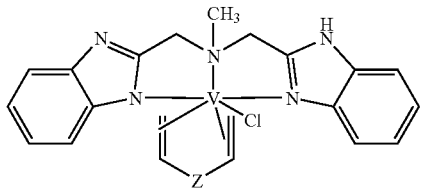

Z = divalent organic or inorganic radical as
—CH2—, —O—,

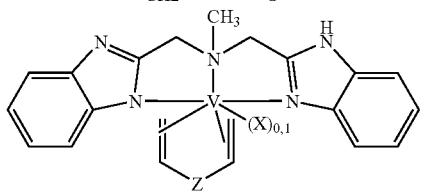

Z = divalent organic or inorganic radical as
—CH2—, —O—, etc.
X = Cl, Br, I, NMe2, OR, SR, etc.

The catalyst of the present invention can, if desired, be utilised mixed together with a conventional support material. Suitable support materials are, for example, silica, alumina, or zirconia, magnesia, magnesium chloride or a polymer or prepolymer, for example polyethylene, polystyrene, or poly(aminostyrene).

The catalysts of the present invention can if desired comprise more than one of the defined transition metal compounds.

In addition to said one or more defined transition metal compounds, the catalysts of the present invention can also include one or more other catalysts for polymerising 1-olefins. Preferably such catalysts are other types of transition metal compounds or catalysts, for example, transition metal compounds of the type used in conventional Ziegler-Natta catalyst systems, metallocene-based catalysts, non metallocene transition metal or lanthamide based catalysts or heat activated supported chromium oxide catalysts (eg Phillips-type catalyst). The catalysts of the present invention may also used in conjunction with other catalysts producing only 1-olefins, either inside or outside the polymerisation reactor, and in this way make copolymers of ethylene or propylene and these 1-olefins. Suitable catalysts for producing 1-olefins may produce only 1-butene, only 1-hexene or a distribution (for example, a Schulz-Flory distribution) of 1-olefins.

The catalyst or catalysts of the present invention can be employed, if desired, using processes analogous to those disclosed in WO02/46246 and U.S. Pat. No. 6,605,675. For example, a catalyst component slurry and a catalyst component solution can be combined before or during introduction into the polymerisation reactor. The properties of polymers produced using such methods can be advantageously controlled thereby. The catalysts of the present invention can also be employed in the process disclosed in U.S. Pat. No. 6,610,799. In this process, mixtures of two or more supported catalysts can be utilised containing differing amounts of catalyst components wherein the concentrations of the individual catalyst components can be independently controlled within the polymerisation reactor.

If desired the catalysts can be formed in situ in the presence of the defined hydrocarbon-insoluble catalyst-activating support (2) or the said support material can be pre-impregnated or premixed, simultaneously or sequentially, with one or more of the catalyst components. The quantity of support material employed can vary widely, for example from 100,000 to 1 grams per gram of metal present in the transition metal compound of Formula A.

The present invention further provides a process for the polymerisation and copolymerisation of 1-olefins, cycloolefins or dienes, comprising contacting the monomer under polymerisation conditions with the polymerisation catalyst of the present invention.

Suitable monomers for use in making homopolymers using the polymerisation process of the present invention are, for example, ethylene, propylene, butene, hexene, styrene or conjugated or non-conjugated dienes. Preferred monomers are ethylene and propylene. Copolymers can be prepared using the polymerisation process of the present invention using, for example, at least one monomer selected from ethylene, propylene, 1-butene, 1-hexene, 4-methylpentene-1,1-octene, norbornene, substituted norbornenes, dienes, eg butadiene, ethylidene norbornene, methyl methacrylate, methyl acrylate, butyl acrylate, acrylonitrile, vinyl acetate, vinyl chloride, and styrene together with one or more suitable copolymerisable monomers. The latter can be a monomer selected from this list or can be, for example, a different 1-olefin.

A particularly preferred process in accordance with the present invention is the copolymerisation of ethylene and or propylene with comonomers selected from 1-olefins, acrylic acid esters, vinyl esters and vinyl aromatic compounds. Examples of suitable comonomers are 1-butene, 1-hexene, 4-methylpentene-1, methyl methacrylate, methyl acrylate, butyl acrylate, acrylonitrile, vinyl acetate, and styrene.

Preferred polymerisation processes are the homopolymerisation of ethylene or the homopolymerisation of propylene or copolymerisation of ethylene with one or more of propylene, butene, hexene-1 and 4-methylpentene-1 or copolymerisation of propylene with one or more of ethylene or butene.

The polymerisation conditions can be, for example, bulk phase, solution phase, slurry phase or gas phase. If desired, the catalyst can be used to polymerise ethylene under high pressure/high temperature process conditions wherein the polymeric material forms as a melt in supercritical ethylene. Preferably the polymerisation is conducted under gas phase fluidised or stirred bed conditions.

Slurry phase polymerisation conditions or gas phase polymerisation conditions are particularly useful for the production of high-density grades of polyethylene. In these processes the polymerisation conditions can be batch, continuous or semi-continuous. In the slurry phase process and the gas phase process, the catalyst is generally fed to the polymerisation zone in the form of a particulate solid. This solid can be, for example, an undiluted solid catalyst system formed from the complex A and an activator, or can be the solid complex A alone. In the latter situation, the activator can be fed to the polymerisation zone, for example as a solution, separately from or together with the solid complex. Preferably the catalyst system or the transition metal complex component of the catalyst system employed in the slurry polymerisation and gas phase polymerisation is supported on a support material. Most preferably the catalyst system is supported on a support material prior to its introduction into the polymerisation zone. Suitable support materials are, for example, silica, alumina, zirconia, talc, kieselguhr, magnesia, magnesium chloride and polymers. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques.

In the slurry phase polymerisation process the solid particles of catalyst, or supported catalyst, are fed to a polymerisation zone either as dry powder or as a slurry in the polymerisation diluent. Preferably the particles are fed to a polymerisation zone as a suspension in the polymerisation diluent. The polymerisation zone can be, for example, an autoclave or similar reaction vessel, or a continuous loop reactor, e.g. of the type well know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase or solution phase polymerisation conditions. The quantity of hydrogen gas to be employed to give the desired average molecular weight can be determined by simple "trial and error" polymerisation tests.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (eg recycled gaseous monomer) and/or volatile liquid (eg a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid is small in relation to the quantity of polymer present in the polymerisation zone. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

A problem that can occur in the gas and slurry phase polymerisation of olefins is that of fouling of the reactor walls, any stirrer that may be present and spalling or agglomeration of the polymer due, for example, to the presence of static electricity. The problem can be reduced or eliminated by judicious use of suitable antistatic agents. One example of a family of antistatic agents suitable for use in the polymerisation of olefins are commercially available under the trade name "STADIS".

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

The catalyst of the present invention can be used in conventional commercial polymerisation facilities and its use can be sandwiched between production runs using other commercial catalyst systems of the supported or unsupported type, eg, using Ziegler Natta catalysts, metallocene catalysts, heat activated chromium oxide catalysts and late transition metal catalyst systems. Transitioning between catalyst systems of these types has been extensively described in the prior art and reference may be made to the prior art methods for analogously suitable methods readily adaptable to use of the catalyst of the present invention. For example, see EP 751965, U.S. Pat. No. 5,442,019, U.S. Pat. No. 5,672,665, U.S. Pat. No. 5,747,612, U.S. Pat. No. 5,753,786, EP 830393, U.S. Pat. No. 5,672,666, EP 1171486, EP885247, EP 1182216, U.S. Pat. No. 6,284,849. US2004/0127655, WO04/060938, US2004/0138391, WO, 04/060921, WO04/060922, WO04/060929, WO04/060930, and WO04/060931.

The present invention also provides a process for the oligomerisation and cooligomerisation of 1-olefins, comprising contacting the monomeric olefin under oligomerisation conditions with the catalyst of the present invention.

Suitable monomers for use in making homooligomers using the oligomerisation process of the of the present invention are, for example, ethylene, propylene, butene, hexene, and styrene. The preferred monomer is ethylene.

Suitable monomers for use in making co-oligomers using the oligomerisation process of the present invention are ethylene, propylene, 1-butene, 1-hexene, 1-octene, 1-decene, 1-dodecene and further 1-olefins of the series $C(n)H(2n)$ where n is an integer.

There exist a number of options for the oligomerisation reactor including batch, semi-batch, and continuous operation. The oligomerisation and co-oligomerisation reactions of the present invention can be performed under a range of process conditions that are readily apparent to those skilled in the art: as a homogeneous liquid phase reaction in the presence or absence of an inert hydrocarbon diluent such as toluene or heptanes; as a two-phase liquid/liquid reaction; as a slurry process where the catalyst is in a form that displays little or no solubility; as a bulk process in which essentially neat reactant and/or product olefins serve as the dominant medium; as a gas-phase process in which at least a portion of the reactant or product olefin(s) are transported to or from a supported form of the catalyst via the gaseous state. Evaporative cooling from one or more monomers or inert volatile liquids is but one method that can be employed to effect the removal of heat from the reaction. The (co-)oligomerisation reactions may be performed in the known types of gas-phase reactors, such as circulating bed, vertically or horizontally stirred-bed, fixed-bed, or fluidised-bed reactors, liquid-phase reactors, such as plug-flow, continuously stirred tank, or loop reactors, or combinations thereof. A wide range of methods for effecting product, reactant, and catalyst separation and/or purification are known to those skilled in the art and may be employed: distillation, filtration, liquid-liquid separation, slurry settling, extraction, etc. One or more of these methods may be performed separately from the (co-)oligomerisation reaction or it may be advantageous to integrate at least some with a (co-)oligomerisation reaction; a non-limiting example of this would be a process employing catalytic (or reactive) distillation. Also advantageous may be a process which includes more than one reactor, a catalyst kill system between reactors or after the final reactor, or an integrated reactor/separator/purifier. While all catalyst components, reactants, inerts, and products could be employed in the present invention on a once-through basis, it is often economically advantageous to recycle one or more of these materials; in the case of the catalyst system, this might require reconstituting one or more of the catalysts components to achieve the active catalyst system. It is within the scope of this invention that a (co)oligomerisation product might also serve as a reactant (e.g. 1-hexene, produced via the oligomerisation of ethylene, might be converted to decene products via a subsequent co-oligomermerisation reaction with two further ethylene units).

The catalyst systems of the present invention can present a variety of advantages over the prior art systems. In general the catalysts are easy to synthesise, have high activity and good catalyst life when employed under conventional industrial polymerisation conditions. Generally the catalysts exhibit single site behaviour which tends to favour the production of narrow molecular weight distribution polymers having uniform properties. Generally, the vanadium based catalysts of the present invention are capable of making very high molecular weight polymers.

The invention is further illustrated with reference to the following Examples. In the Examples all manipulations of air/moisture-sensitive materials were performed on a conventional vacuum/inert atmosphere (nitrogen) line using standard Schlenk line techniques, or in an inert atmosphere glove box.

The following complexes are referred to in the Examples:

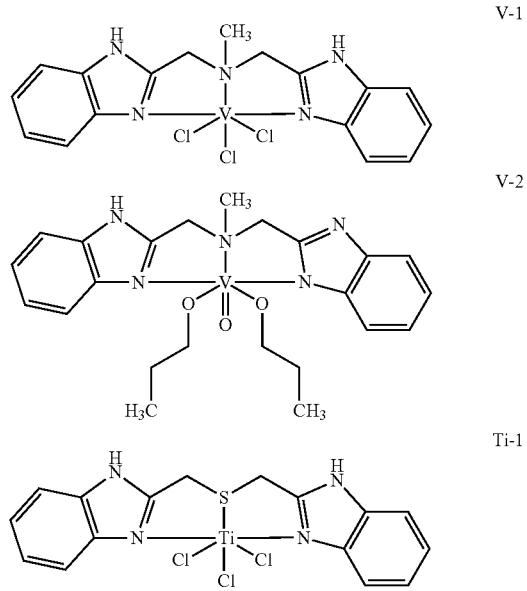

EXAMPLE 1

1.1 Preparation of 1M Solution of MgCl$_2$/EtHe Adduct in Decane ("Solution 1")

This solution was prepared by refluxing of 9.5 g anhydrous MgCl$_2$ in a mixture of 45 ml 2-ethylhexanol and 45 ml decane for 2 hours under nitrogen atmosphere.

1.2 Preparation of 0.1 M Solution of MgCl$_2$/EtHe adduct in toluene/decane ("Solution 2")

A 0.1 M solution of MgCl$_2$ EtHe adduct in toluene was prepared by diluting 14 ml 1M MgCl$_2$/EtHe in decane, with 126 ml toluene.

EXAMPLE 2

Ethylene Polymerisation in the Presence of in Situ Supported V-2 Catalyst on MgCl$_2$/AlMe$_n$(OEtHe)$_{3-n}$ A Fisher-Porter glass reactor was filled with 230 ml toluene and heated to 75° C. using a water bath and then saturated with ethylene at 1 bar. The stirrer rate was set to 800 rpm and 8 ml of "Solution 2" and 1.2 ml 2M trimethylaluminium (TMA) were added consecutively. This was followed by the addition of 1 ml 1M (dimethylaluminium chloride) DMAC and 4 ml 0.1 M (ethyltrichloroacetate) ETA at 5 minute intervals. The polymerisation was initiated by the addition of 1.2 ml 0.84 mM solution of complex V-2 in toluene and carried out at 90° C., at 1 bar ethylene pressure for 15 minutes. At the end of the run, the ethylene pressure was released and the formed polymer filtered off. Yield—18.8 g. Activity—75200 g mmol$^{-1}$h$^{-1}$bar$^{-1}$. Mn>2.10$^6$ D.

EXAMPLE 3

Ethylene Polymerisation in the Presence of in Situ Supported V-2 Catalyst on MgCl$_2$/AlMe$_n$(OEtHe)$_{3-n}$ This polymerisation was carried out in a manner similar to that described in Example 2. Polymerisation temperature—110° C. Polymerisation time—8 min. Polymer yield—14.0 g. Activity—105000 g mmol$^{-1}$h$^{-1}$bar$^{-1}$

EXAMPLE 4

Ethylene Polymerisation in the Presence of Preformed V-2/MgCl$_2$/AlMe$_n$(OEtHe)$_{3-n}$ Catalyst.

An aliquot of 8 ml of "Solution 2" (0.8 mmol Mg) were heated to 75° C. and then saturated with ethylene at 1 bar. At vigorous stirring, 2M TMA (1.2 ml) in toluene was added. The mixture was stirred for 5 minutes and then 1M DMAC (1 ml) in hexanes was added. After 5 minutes 0.1 M solution (4 ml) of ETA was added. The mixture was stirred for another 5 minutes and left at room temperature overnight after the ethylene was vented off. The next morning, 0.31 mM solution (3.2 ml) of V-2 in toluene was added at vigorous stirring at room temperature and the mixture stirred at room temperature for 2 hours. Thus prepared the slurry of the supported vanadium catalyst (14.2 ml, 1 μmol V) was injected into a Fischer-Porter reactor, containing heptane (270 ml) at 75° C. under 1 bar ethylene pressure. The polymerization was carried out for 1 hour at 82° C. At the end of the run, the ethylene pressure was released and the formed polymer filtered off. Polymer yield—25.2 g. Activity—25200 g mmol$^{-1}$h$^{-1}$bar$^{-1}$. Mn>2.10$^6$D.

EXAMPLE 5

Preparation of MgCl$_2$/AlMe$_n$(OEtHe)$_{3-n}$/DMAC Support

A 2M solution of TMA in toluene (4.8 ml) were added with vigorous stirring, at 75° C., to a Schlenk tube containing "Solution 2" (32 ml). After stirring for 5 minutes 1M DMAC in hexanes (4 ml) and a 0.1 M solution of ETA in toluene (16 ml) were consecutively added at intervals of five minutes. A slurry of MgCl$_2$/AlMe$_n$(O2EtHe)$_{3-n}$ was obtained and cooled and stored at room temperature.

EXAMPLE 6

Preparation of MgCl$_2$/AlMe$_n$(OEtHe)$_{3-n}$/MADC (Methylaluminium Dichloride) Support The preparation was as in Example 5 with the exception that MADC was used instead of DMAC.

EXAMPLE 7

Ethylene Polymerisation using V-1 Supported on MgCl$_2$/AlMn(OEtHe)$_{3-n}$.

A combined slurry of 14.2 ml of the catalyst support described in 5 and complex V-1 (0.45 mg-1 μmol), suspended in 2 ml toluene was stirred at room temperature for 2 hours. It was then transferred into a Fischer-Porter reactor, containing 250 ml heptane at 75° C. under 1 bar ethylene pressure. The polymerisation was carried out for 1 hour at 80° C. At the end of the run, the ethylene pressure was released and the formed polymer filtered off. Polymer yield—10.0 g. Activity—10000 g mmol$^{-1}$h$^{-1}$bar$^{-1}$. Mn>2.10$^6$D.

EXAMPLE 8

Ethylene Polymerisation in the Presence of Ti-1 Supported on MgCl$_2$/AlMe$_n$(OEtHe)$_{3-n}$ An activated solution of Ti-1 was first prepared by addition of 0.5 ml 1M MADC (methylaluminiumdichloride) to a slurry of 7.5 mg Ti-1 in 50 ml toluene. An aliquot of 3 ml of this solution and 14.2 ml of the catalyst support described in 6 were stirred at room temperature for 15 minutes. It was then transferred into a Fischer-Porter reactor, containing 250 ml toluene at 70° C. under 1 bar ethylene pressure. The polymerisation was carried out for 40 minutes at 80° C. At the end of the run, the ethylene pressure was released and the formed polymer filtered off. Polymer yield—28.0 g. Activity—42000 g mmol$^{-1}$h$^{-1}$bar$^{-1}$.

List of Abbreviations used in the Examples:
1. EtHe is 2-ethylhexanol
2. TMA is trimethylaluminium
3. DMAC is dimethylaluminium chloride
4. ETA is ethyltrichloroacetate
5. MADC is methylaluminium dichloride.

The invention claimed is:
1. A polymerisation catalyst composition comprising
  (1) a transition metal compound having the following Formula A,

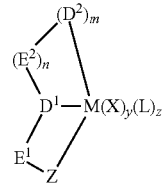

Formula A wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor atoms or groups; $E^1$ and $E^2$ are not linked other than through the donor atom or group $D^1$; X is an anionic group, L is a neutral donor group; n=m=1; y and z are independently zero or integers such that the number of X and L groups satisfy the valency and oxidation state of the metal M,
  (2) a catalyst-activating support which is a solid particulate substance, insoluble in hydrocarbons, comprising at least magnesium and aluminium atoms and hydrocarbyloxy groups containing 1 to 20 carbons atoms, the molar ratio of Mg/Al being in the range 1.0 to 300 and the molar ratio of hydrocarbyloxy groups to aluminium atoms being in the range 0.05 to 2.0, and
  (3) an additional activator selected from aluminium alkyl activators and boron compound activators.

2. A polymerisation catalyst as claimed in claim 1 wherein the average particle size of the support material is in the range 3 to 80 micrometers (μm).

3. A polymerisation catalyst as claimed in claim 1 wherein at least one of the atoms present in the ring of the five-membered heterocyclic group Z is bonded directly to $E^1$ and a second atom in the ring is bonded directly to M.

4. A polymerisation catalyst as claimed in claim 1 wherein the atom in the five-membered ring bonded directly to $E^1$ is adjacent to a second atom in said ring, said second atom being bonded directly to M.

5. A polymerisation catalyst as claimed in claim 1 wherein Z is an imidazole-containing group.

6. A polymerisation catalyst as claimed in claim 1 wherein $D^2$ and Z are identical imidazole containing groups.

7. A polymerisation catalyst as claimed in claim 5 or 6 wherein the imidazole-containing group Z is selected from the group consisting of formula I, II and III

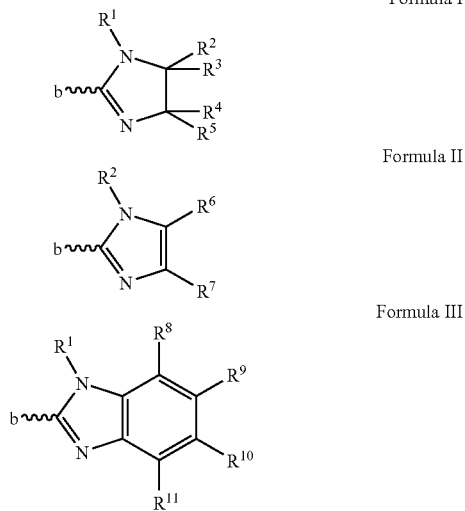

Formula I

Formula II

Formula III $R^1$ to $R^{11}$ being independently hydrogen or a monovalent (i) aliphatic hydrocarbon, (ii) alicyclic hydrocarbon, (iii) aromatic hydrocarbon, (iv) alkyl substituted aromatic hydrocarbon, (v) heterocyclic groups, (vi) heterosubstituted derivatives of said groups (i) to (v), and (vii) hydrocarbyl-substituted heteroatom groups and the free valence bond b being bonded to E.

8. A polymerisation catalyst as claimed in claim 7 wherein the bond between Z and M in Formula A is provided by a bond connected from M to one of the nitrogen atoms of the group depicted in Formula I, II or III.

9. A polymerisation catalyst as claimed in claim 1 wherein M is selected from Sc, Ti, Zr, Hf, V, Nb, Ta, Cr, Mo, W, and Mn.

10. A polymerisation catalyst as claimed in claim 1 wherein the anionic group X is selected from chloride, bromide, methyl, benzyl, phenyl, acetate, acetylacetonate; diethyl amide, methoxide, ethoxide, phenoxide and hydroxyl.

11. A polymerisation catalyst as claimed in claim 1 wherein X is a non-coordinating or weakly-coordinating anion.

12. A polymerisation catalyst as claimed in claim 11 wherein X is tetrafluoroborate, a fluorinated aryl borate or a triflate.

13. A polymerisation catalyst as claimed in claim 1 wherein the neutral donor group L is selected from diethyl ether, THF, diethyl amine, trimethylamine, pyridine, trimethyl phosphine, triphenyl phosphine, water; an olefin and a neutral, conjugated or nonconjugated diene.

14. A polymerisation catalyst as claimed in claim 1 wherein the activator (3) for the catalyst is selected from organoaluminium compounds, organoboron compounds and mixtures thereof.

15. A polymerisation catalyst as claimed in claim 14 wherein the organoaluminium compound is selected from trimethylaluminium, triethylaluminium, tributylaluminium, tri-n-octylaluminium, ethylaluminium dichloride, diethylaluminium chloride, tris(pentafluorophenyl)aluminium and an alumoxane.

16. A polymerisation catalyst as claimed in claim 14 wherein the organoboron compound is selected from dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]$borate, trityltetra(pentafluorophenyl)borate and tris(pentafluorophenyl) boron.

17. A polymerisation catalyst as claimed in claim 1 wherein the catalyst contains a halogen compound catalyst promoter.

18. A polymerisation catalyst as claimed in claim 17 wherein the promoter is selected from carbon tetrachloride, hexachloroethylene, benzylbromide, benzylchloride, 2,3-dichloropropylene, 1,3-dichloropropylene, ethyl trichloroacetate, chloroform and n-butylchloride.

19. A polymerisation catalyst comprising a catalyst as claimed in claim 1 together with one or more other catalysts for polymerising 1-olefins.

20. A polymerisation catalyst as claimed in claim 19 wherein the one or more other catalysts are selected from Ziegler-Natta catalyst systems, metallocene-based catalysts, non metallocene transition metal or lanthanide based catalysts and heat activated supported chromium oxide catalysts.

21. A process for the polymerisation and copolymerisation of 1-olefins, cycloolefins or dienes, comprising contacting the monomer under polymerisation conditions with the polymerisation catalyst claimed in claim 1.

22. A process for making homopolymer comprising contacting the catalyst claimed in claim 1 with a monomer selected from ethylene, propylene, butene, hexene, styrene or conjugated or non-conjugated dienes.

23. A process for making copolymer comprising contacting the catalyst claimed in claim 1 with at least one monomer selected from ethylene, propylene, 1-butene, 1-hexene, 4-methylpentene-1,1-octene, norbornene, substituted norbornenes, dienes, ethylidene norbornene, methyl methacrylate, methyl acrylate, butyl acrylate, acrylonitrile, vinyl acetate, vinyl chloride, and styrene.

24. A process for making copolymer comprising contacting the catalyst claimed in claim 1 with ethylene and one or more of propylene, butene, hexene-1 and 4-methylpentene-1.

25. A process for making copolymer comprising contacting the catalyst claimed in claim 23 wherein the diene is butadiene.

* * * * *